United States Patent
Xu et al.

(10) Patent No.: US 11,470,511 B2
(45) Date of Patent: Oct. 11, 2022

(54) RESOLVING CONFLICTING RATE MATCHING RESOURCE INDICATIONS

(71) Applicant: QUALCOMM Incorporated, San Diego, CA (US)

(72) Inventors: Huilin Xu, San Diego, CA (US); Kazuki Takeda, Tokyo (JP); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/184,377

(22) Filed: Feb. 24, 2021

(65) Prior Publication Data
US 2021/0282055 A1 Sep. 9, 2021

Related U.S. Application Data

(60) Provisional application No. 62/985,188, filed on Mar. 4, 2020.

(51) Int. Cl.
*H04W 28/22* (2009.01)
(52) U.S. Cl.
CPC .................. *H04W 28/22* (2013.01)
(58) Field of Classification Search
CPC .... H04W 28/22; H04L 1/0013; H04L 5/0044; H04L 5/0053; H04L 5/0094
See application file for complete search history.

(56) References Cited

U.S. PATENT DOCUMENTS

| 2014/0126490 A1* | 5/2014 | Chen ..................... H04L 1/0067 370/328 |
| 2019/0045490 A1 | 2/2019 | Davydov et al. |
| 2019/0230689 A1* | 7/2019 | Cao .......................... H04L 1/08 |

(Continued)

OTHER PUBLICATIONS

Huawei, et al., "Discussion on Conditions of Rate Matching Pattern Overlapping with PDSCH DMRS Symbols", 3GPP Draft, R1-1907489, 3GPP TSG RAN WG1 Meeting #97, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728922, 4 Pages, Retrieved from the Internet: URL: http://www.3gpp.org/ftp/Meetings%5F3GPP%5FSYNC/RAN1/Docs/R1%2D1907489%2Ezip [retrieved on May 13, 2019] Sections 1-3, the whole document.

(Continued)

*Primary Examiner* — Stephen J Clawson
(74) *Attorney, Agent, or Firm* — Holland & Hart LLP

(57) ABSTRACT

Methods, systems, and devices for wireless communications are described. A user equipment (UE) may receive a first rate matching resource indication that indicates that a first rate matching resource is available for use by the UE in reception of a downlink shared channel. The UE may also receive a second rate matching resource indication that indicates that a second rate matching resource is not available for use by the UE in reception of the downlink shared channel. The UE may identify a rate matching resource indication conflict arising from an overlap of at least one resource element included in both the first rate matching resource and the second rate matching resource. The UE may then resolve the rate matching resource indication conflict in accordance with a conflict resolution rule.

30 Claims, 21 Drawing Sheets

(56) References Cited

U.S. PATENT DOCUMENTS

| | | | |
|---|---|---|---|
| 2019/0349977 A1 | 11/2019 | Hosseini et al. | |
| 2020/0204311 A1* | 6/2020 | Yoon | H04W 72/12 |
| 2020/0367277 A1* | 11/2020 | Hosseini | H04W 72/1247 |
| 2021/0344442 A1* | 11/2021 | Jiang | H04L 1/001 |

OTHER PUBLICATIONS

International Search Report and Written Opinion—PCT/US2021/019562—ISA/EPO—dated Jun. 4, 2021.
Mediatek Inc: "Clarification for sPDSCH Rate Matching Behavior with Two SPDCCH PRB Set", 3GPP Draft, 3GPP Tsg Ran WG1 #92bis, R1-1805087-Mediatek-Clarification for SPDSCH Rate Matching Behavior with Two Spdcch Prb Set, 3rd Generation Partnership Project (3GPP), Mobile Competence Centre; 650, Route Des Lucioles; vol. RAN WG1, No. Sanya, China; Apr. 16, 2018-Apr. 20, 2018, Apr. 15, 2018 (Apr. 15, 2018), XP051427347, 4 Pages, Retrieved from the Internet: URL: http://www.3gpp.org/ftp/Meetings%5F3GPP%5FSYNC/RAN1/Docs/ [retrieved on Apr. 15, 2018], Sections 2-3, Sections 1-2.

* cited by examiner

RESOLVING CONFLICTING RATE MATCHING RESOURCE INDICATIONS

CROSS REFERENCE

The present Application for Patent claims the benefit of U.S. Provisional Patent Application No. 62/985,188 by XU et al., entitled "RESOLVING CONFLICTING RATE MATCHING RESOURCE INDICATIONS," filed Mar. 4, 2020, assigned to the assignee hereof, and expressly incorporated by reference herein.

FIELD OF TECHNOLOGY

The following relates generally to wireless communications and more specifically to resolving conflicting rate matching resource indications.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

A UE may be configured with rate matching resources that overlap resources allocated to the UE. The UE may be indicated whether the rate matching resources are available to the UE, or if the rate matching resources are being used for other signaling. Techniques for sending these indications can be improved.

SUMMARY

The described techniques relate to improved methods, systems, devices, and apparatuses that support resolving conflicting rate matching resource indications. Generally, the described techniques provide for resolving conflicts between two or more rate matching resource indications that give conflicting information to a user equipment (UE). A base station may allocate resources for a downlink shared channel, such as a physical downlink shared channel (PDSCH), to a UE. In some cases, the network may reserve a part of the PDSCH resource allocation for other purposes. For example, a base station may configure a rate matching resource within the PDSCH resource allocation. If rate matching is enabled, the base station may transmit downlink shared channel signaling on the downlink shared channel resource allocation except for the rate matching resource, which may then be used for other signaling or channels. In some cases, the UE may receive multiple rate matching resource indications. However, in some cases, the UE may receive conflicting rate matching resource indications. For example, a first rate matching resource and a second rate matching resource may include some overlapping resource elements. If a first indication for the first rate matching resource indicates that the overlapping resources are available for the downlink shared channel and a second indication indicates that the overlapping resources are not available, the UE may be indicated that the overlapping resources are both available and unavailable at the same time.

A UE may resolve conflicting rate matching resource indications by implementing techniques described herein. In some cases, the UE may be configured with a set of rules for resolving conflicting rate matching resource indications. In some cases, the UE may rate match the overlapping resources. In some cases, the UE may monitor the overlap to receive PDSCH. In some cases, the base station may indicate whether the UE is to monitor or rate match the overlap. The UE may resolve the conflicting indication to prevent downlink shared channel loss and communications failures. Various examples of conflicting indications and resolutions to these conflicts are described herein.

A method of wireless communications at a UE is described. The method may include receiving a first rate matching resource indication that indicates that a first rate matching resource is available for use by the UE in reception of a downlink shared channel, receiving a second rate matching resource indication that indicates that a second rate matching resource is not available for use by the UE in reception of the downlink shared channel, identifying a rate matching resource indication conflict arising from an overlap of at least one resource element included in both the first rate matching resource and the second rate matching resource, and resolving the rate matching resource indication conflict in accordance with a conflict resolution rule.

An apparatus for wireless communications at a UE is described. The apparatus may include a processor, memory coupled with the processor, and instructions stored in the memory. The instructions may be executable by the processor to cause the apparatus to receive a first rate matching resource indication that indicates that a first rate matching resource is available for use by the UE in reception of a downlink shared channel, receive a second rate matching resource indication that indicates that a second rate matching resource is not available for use by the UE in reception of the downlink shared channel, identify a rate matching resource indication conflict arising from an overlap of at least one resource element included in both the first rate matching resource and the second rate matching resource, and resolve the rate matching resource indication conflict in accordance with a conflict resolution rule.

Another apparatus for wireless communications at a UE is described. The apparatus may include means for receiving a first rate matching resource indication that indicates that a first rate matching resource is available for use by the UE in reception of a downlink shared channel, receiving a second rate matching resource indication that indicates that a second rate matching resource is not available for use by the UE in reception of the downlink shared channel, identifying a rate matching resource indication conflict arising from an overlap of at least one resource element included in both the first rate matching resource and the second rate matching resource, and resolving the rate matching resource indication conflict in accordance with a conflict resolution rule.

A non-transitory computer-readable medium storing code for wireless communications at a UE is described. The code may include instructions executable by a processor to receive a first rate matching resource indication that indicates that a first rate matching resource is available for use by the UE in reception of a downlink shared channel, receive a second rate matching resource indication that indicates that a second rate matching resource is not available for use by the UE in reception of the downlink shared channel, identify a rate matching resource indication conflict arising from an overlap of at least one resource element included in both the first rate matching resource and the second rate matching resource, and resolve the rate matching resource indication conflict in accordance with a conflict resolution rule.

In some examples of the method, apparatuses, and non-transitory computer-readable medium described herein, identifying the rate matching resource indication conflict may include operations, features, means, or instructions for receiving the first rate matching resource indication via downlink control information dynamically indicating that the first rate matching resource may be available for use by the UE in reception of the downlink shared channel, and identifying that the second rate matching resource indication indicates that the second rate matching resource may be not included in any rate matching pattern groups for the UE.

In some examples of the method, apparatuses, and non-transitory computer-readable medium described herein, resolving the rate matching resource indication conflict further may include operations, features, means, or instructions for monitoring the at least one resource element for the downlink shared channel based on the dynamic indication and the conflict resolution rule.

In some examples of the method, apparatuses, and non-transitory computer-readable medium described herein, resolving the rate matching resource indication conflict further may include operations, features, means, or instructions for rate matching around the at least one resource element based on the conflict resolution rule.

In some examples of the method, apparatuses, and non-transitory computer-readable medium described herein, the first rate matching resource may be included within a first rate matching pattern group.

In some examples of the method, apparatuses, and non-transitory computer-readable medium described herein, identifying the rate matching resource indication conflict may include operations, features, means, or instructions for receiving downlink control information dynamically indicating that the first rate matching resource included within a first rate matching pattern group may be available for use by the UE in reception of the downlink shared channel, and the second rate matching resource included within a second rate matching pattern group may be not available for use by the UE in reception of the downlink shared channel.

In some examples of the method, apparatuses, and non-transitory computer-readable medium described herein, the conflict resolution rule may be based on a priority of the first rate matching pattern group and the second rate matching pattern group.

In some examples of the method, apparatuses, and non-transitory computer-readable medium described herein, the conflict resolution rule may be based on a priority of the first rate matching resource indication and the second rate matching resource indication.

In some examples of the method, apparatuses, and non-transitory computer-readable medium described herein, resolving the rate matching resource indication conflict further may include operations, features, means, or instructions for monitoring the at least one resource element for the downlink shared channel based on the dynamic indication and the conflict resolution rule.

In some examples of the method, apparatuses, and non-transitory computer-readable medium described herein, resolving the rate matching resource indication conflict further may include operations, features, means, or instructions for rate matching around the at least one resource element based on the conflict resolution rule.

In some examples of the method, apparatuses, and non-transitory computer-readable medium described herein, identifying the rate matching resource indication conflict may include operations, features, means, or instructions for receiving downlink control information dynamically indicating that the first rate matching resource that may be included within a first rate matching pattern group may be available for use by the UE in reception of the downlink shared channel, where the downlink control information also dynamically indicates a third rate matching resource included within a second rate matching pattern group that overlaps the first rate matching resource and the second rate matching resource by the at least one resource element, and identifying that the second rate matching resource indication indicates that the second rate matching resource may be not included in any rate matching pattern groups for the UE.

In some examples of the method, apparatuses, and non-transitory computer-readable medium described herein, the downlink control information dynamically indicates that the third rate matching resource included within the second rate matching pattern group may be available for use by the UE in reception of the downlink shared channel.

In some examples of the method, apparatuses, and non-transitory computer-readable medium described herein, resolving the rate matching resource indication conflict further may include operations, features, means, or instructions for monitoring the at least one resource element for the downlink shared channel based on the dynamic indication and the conflict resolution rule.

In some examples of the method, apparatuses, and non-transitory computer-readable medium described herein, resolving the rate matching resource indication conflict further may include operations, features, means, or instructions for rate matching around the at least one resource element based on the conflict resolution rule.

In some examples of the method, apparatuses, and non-transitory computer-readable medium described herein, the downlink control information dynamically indicates that the third rate matching resource included within the second rate matching pattern group may be not available for use by the UE in reception of the downlink shared channel.

In some examples of the method, apparatuses, and non-transitory computer-readable medium described herein, the conflict resolution rule may be based on a priority of the first rate matching pattern group, the second rate matching pattern group, and the third rate matching resource.

In some examples of the method, apparatuses, and non-transitory computer-readable medium described herein, the conflict resolution rule may be based on a priority of the first rate matching resource indication, the second rate matching resource indication, and a third rate matching resource indication that indicates the third rate matching resource.

In some examples of the method, apparatuses, and non-transitory computer-readable medium described herein, resolving the rate matching resource indication conflict further may include operations, features, means, or instructions for monitoring the at least one resource element for the downlink shared channel based on the dynamic indication and the conflict resolution rule.

In some examples of the method, apparatuses, and non-transitory computer-readable medium described herein, resolving the rate matching resource indication conflict further may include operations, features, means, or instructions for rate matching around the at least one resource element based on the conflict resolution rule.

In some examples of the method, apparatuses, and non-transitory computer-readable medium described herein, the first rate matching resource indication includes a resource block-level indication that the first rate matching resource may be available for use by the UE in reception of the downlink shared channel, and the second rate matching resource indication includes a resource element-level indication that the second rate matching resource may be not available for use by the UE in reception of the downlink shared channel.

In some examples of the method, apparatuses, and non-transitory computer-readable medium described herein, resolving the rate matching resource indication conflict further may include operations, features, means, or instructions for monitoring the at least one resource element for the downlink shared channel based on the resource block-level indication.

In some examples of the method, apparatuses, and non-transitory computer-readable medium described herein, resolving the rate matching resource indication conflict further may include operations, features, means, or instructions for rate matching around the at least one resource element based on the resource element-level indication.

Some examples of the method, apparatuses, and non-transitory computer-readable medium described herein may further include operations, features, means, or instructions for receiving, from a base station, an indication of whether to monitor the at least one resource element for the downlink shared channel or to rate match around the at least one resource element, where the rate matching resource indication conflict may be resolved based on the indication from the base station.

A method of wireless communications is described. The method may include receiving a first rate matching resource indication that indicates that a first rate matching resource is available for use by the UE in reception of a downlink shared channel, receiving a second rate matching resource indication that indicates that a second rate matching resource is not available for use by the UE in reception of the downlink shared channel, determining that the first rate matching resource and the second rate matching resource are allocated in accordance with a scheduling constraint that prevents overlapping resource elements from the first rate matching resource and the second rate matching resource, and receiving the downlink shared channel in accordance with the first rate matching resource indication, the second rate matching resource indication, and the scheduling constraint.

An apparatus for wireless communications is described. The apparatus may include a processor, memory coupled with the processor, and instructions stored in the memory. The instructions may be executable by the processor to cause the apparatus to receive a first rate matching resource indication that indicates that a first rate matching resource is available for use by the UE in reception of a downlink shared channel, receive a second rate matching resource indication that indicates that a second rate matching resource is not available for use by the UE in reception of the downlink shared channel, determine that the first rate matching resource and the second rate matching resource are allocated in accordance with a scheduling constraint that prevents overlapping resource elements from the first rate matching resource and the second rate matching resource, and receive the downlink shared channel in accordance with the first rate matching resource indication, the second rate matching resource indication, and the scheduling constraint.

Another apparatus for wireless communications is described. The apparatus may include means for receiving a first rate matching resource indication that indicates that a first rate matching resource is available for use by the UE in reception of a downlink shared channel, receiving a second rate matching resource indication that indicates that a second rate matching resource is not available for use by the UE in reception of the downlink shared channel, determining that the first rate matching resource and the second rate matching resource are allocated in accordance with a scheduling constraint that prevents overlapping resource elements from the first rate matching resource and the second rate matching resource, and receiving the downlink shared channel in accordance with the first rate matching resource indication, the second rate matching resource indication, and the scheduling constraint.

A non-transitory computer-readable medium storing code for wireless communications is described. The code may include instructions executable by a processor to receive a first rate matching resource indication that indicates that a first rate matching resource is available for use by the UE in reception of a downlink shared channel, receive a second rate matching resource indication that indicates that a second rate matching resource is not available for use by the UE in reception of the downlink shared channel, determine that the first rate matching resource and the second rate matching resource are allocated in accordance with a scheduling constraint that prevents overlapping resource elements from the first rate matching resource and the second rate matching resource, and receive the downlink shared channel in accordance with the first rate matching resource indication, the second rate matching resource indication, and the scheduling constraint.

Some examples of the method, apparatuses, and non-transitory computer-readable medium described herein may further include operations, features, means, or instructions for monitoring the first rate matching resource for the downlink shared channel based on the scheduling constraint.

Some examples of the method, apparatuses, and non-transitory computer-readable medium described herein may further include operations, features, means, or instructions for rate matching around the second rate matching resource based on the scheduling constraint.

A method of wireless communications at a base station is described. The method may include transmitting a first rate matching resource indication that indicates to a UE that a first rate matching resource is available for use by the UE in reception of a downlink shared channel, transmitting a second rate matching resource indication that indicates that a second rate matching resource is not available for use by the UE in reception of the downlink shared channel, identifying a rate matching resource indication conflict arising from an overlap of at least one resource element included in both the first rate matching resource and the second rate matching resource, resolving the rate matching resource indication conflict in accordance with a conflict resolution rule, and transmitting one or more signals via the downlink shared channel in accordance with the conflict resolution rule.

An apparatus for wireless communications at a base station is described. The apparatus may include a processor, memory coupled with the processor, and instructions stored in the memory. The instructions may be executable by the processor to cause the apparatus to transmit a first rate matching resource indication that indicates to a UE that a first rate matching resource is available for use by the UE in reception of a downlink shared channel, transmit a second rate matching resource indication that indicates that a second rate matching resource is not available for use by the UE in reception of the downlink shared channel, identify a rate matching resource indication conflict arising from an overlap of at least one resource element included in both the first rate matching resource and the second rate matching resource, resolve the rate matching resource indication conflict in accordance with a conflict resolution rule, and transmit one or more signals via the downlink shared channel in accordance with the conflict resolution rule.

Another apparatus for wireless communications at a base station is described. The apparatus may include means for transmitting a first rate matching resource indication that indicates to a UE that a first rate matching resource is available for use by the UE in reception of a downlink shared channel, transmitting a second rate matching resource indication that indicates that a second rate matching resource is not available for use by the UE in reception of the downlink shared channel, identifying a rate matching resource indication conflict arising from an overlap of at least one resource element included in both the first rate matching resource and the second rate matching resource, resolving the rate matching resource indication conflict in accordance with a conflict resolution rule, and transmitting one or more signals via the downlink shared channel in accordance with the conflict resolution rule.

A non-transitory computer-readable medium storing code for wireless communications at a base station is described. The code may include instructions executable by a processor to transmit a first rate matching resource indication that indicates to a UE that a first rate matching resource is available for use by the UE in reception of a downlink shared channel, transmit a second rate matching resource indication that indicates that a second rate matching resource is not available for use by the UE in reception of the downlink shared channel, identify a rate matching resource indication conflict arising from an overlap of at least one resource element included in both the first rate matching resource and the second rate matching resource, resolve the rate matching resource indication conflict in accordance with a conflict resolution rule, and transmit one or more signals via the downlink shared channel in accordance with the conflict resolution rule.

In some examples of the method, apparatuses, and non-transitory computer-readable medium described herein, identifying the rate matching resource indication conflict may include operations, features, means, or instructions for transmitting the first rate matching resource indication via downlink control information dynamically indicating that the first rate matching resource may be available for use by the UE in reception of the downlink shared channel, and identifying that the second rate matching resource indication indicates that the second rate matching resource may be not included in any rate matching pattern groups for the UE.

In some examples of the method, apparatuses, and non-transitory computer-readable medium described herein, resolving the rate matching resource indication conflict further may include operations, features, means, or instructions for transmitting an indication that configures the UE to monitor the at least one resource element for the downlink shared channel based on the dynamic indication and the conflict resolution rule.

In some examples of the method, apparatuses, and non-transitory computer-readable medium described herein, resolving the rate matching resource indication conflict further may include operations, features, means, or instructions for transmitting an indication that configures the UE to rate match around the at least one resource element based on the conflict resolution rule.

In some examples of the method, apparatuses, and non-transitory computer-readable medium described herein, identifying the rate matching resource indication conflict may include operations, features, means, or instructions for transmitting downlink control information dynamically indicating that the first rate matching resource included within a first rate matching pattern group may be available for use by the UE in reception of the downlink shared channel, and the second rate matching resource included within a second rate matching pattern group may be not available for use by the UE in reception of the downlink shared channel.

In some examples of the method, apparatuses, and non-transitory computer-readable medium described herein, resolving the rate matching resource indication conflict further may include operations, features, means, or instructions for transmitting an indication that configures the UE to monitor or rate match based on a priority of the first rate matching pattern group and the second rate matching pattern group.

In some examples of the method, apparatuses, and non-transitory computer-readable medium described herein, the conflict resolution rule may be based on a priority of the first rate matching resource indication and the second rate matching resource indication.

In some examples of the method, apparatuses, and non-transitory computer-readable medium described herein, resolving the rate matching resource indication conflict further may include operations, features, means, or instructions for transmitting the downlink shared channel on the at least one resource element based on the dynamic indication and the conflict resolution rule.

In some examples of the method, apparatuses, and non-transitory computer-readable medium described herein, resolving the rate matching resource indication conflict further may include operations, features, means, or instructions for rate matching around the at least one resource element based on the conflict resolution rule.

In some examples of the method, apparatuses, and non-transitory computer-readable medium described herein, identifying the rate matching resource indication conflict may include operations, features, means, or instructions for transmitting downlink control information dynamically indicating that the first rate matching resource included within a first rate matching pattern group may be available for use by the UE in reception of the downlink shared channel, where the downlink control information also dynamically indicates a third rate matching resource included within a second rate matching pattern group that overlaps the first rate matching resource and the second rate matching resource by the at least one resource element, and identifying that the second rate matching resource indication indicates that the second rate matching resource may be not included in any rate matching pattern groups for the UE.

In some examples of the method, apparatuses, and non-transitory computer-readable medium described herein, the downlink control information dynamically indicates that the third rate matching resource included within the second rate matching pattern group may be available for use by the UE in reception of the downlink shared channel.

In some examples of the method, apparatuses, and non-transitory computer-readable medium described herein, resolving the rate matching resource indication conflict further may include operations, features, means, or instructions for transmitting the downlink shared channel on the at least one resource element based on the dynamic indication and the conflict resolution rule.

In some examples of the method, apparatuses, and non-transitory computer-readable medium described herein, resolving the rate matching resource indication conflict further may include operations, features, means, or instructions for rate matching around the at least one resource element based on the conflict resolution rule.

In some examples of the method, apparatuses, and non-transitory computer-readable medium described herein, the downlink control information dynamically indicates that the third rate matching resource included within the second rate matching pattern group may be not available for use by the UE in reception of the downlink shared channel.

In some examples of the method, apparatuses, and non-transitory computer-readable medium described herein, the conflict resolution rule may be based on a priority of the first rate matching pattern group, the second rate matching pattern group, and the third rate matching group.

In some examples of the method, apparatuses, and non-transitory computer-readable medium described herein, the conflict resolution rule may be based on a priority of the first rate matching resource indication, the second rate matching resource indication, and a third rate matching resource indication that indicates the third rate matching resource.

In some examples of the method, apparatuses, and non-transitory computer-readable medium described herein, resolving the rate matching resource indication conflict further may include operations, features, means, or instructions for transmitting the downlink shared channel on the at least one resource element based on the dynamic indication and the conflict resolution rule.

In some examples of the method, apparatuses, and non-transitory computer-readable medium described herein, resolving the rate matching resource indication conflict further may include operations, features, means, or instructions for rate matching around the at least one resource element based on the conflict resolution rule.

In some examples of the method, apparatuses, and non-transitory computer-readable medium described herein, the first rate matching resource indication includes a resource element-level indication that the first rate matching resource may be available for use by the UE in reception of the downlink shared channel, and the second rate matching resource indication includes a resource block-level indication that the second rate matching resource may be no available for use by the UE in reception of the downlink shared channel.

In some examples of the method, apparatuses, and non-transitory computer-readable medium described herein, resolving the rate matching resource indication conflict further may include operations, features, means, or instructions for transmitting an indication that configures the UE to monitor the at least one resource element for the downlink shared channel based on the resource block-level indication.

In some examples of the method, apparatuses, and non-transitory computer-readable medium described herein, resolving the rate matching resource indication conflict further may include operations, features, means, or instructions for transmitting an indication that configures the UE to rate match around the at least one resource element based on the resource element-level indication.

DETAILED DESCRIPTION

Figure 1:
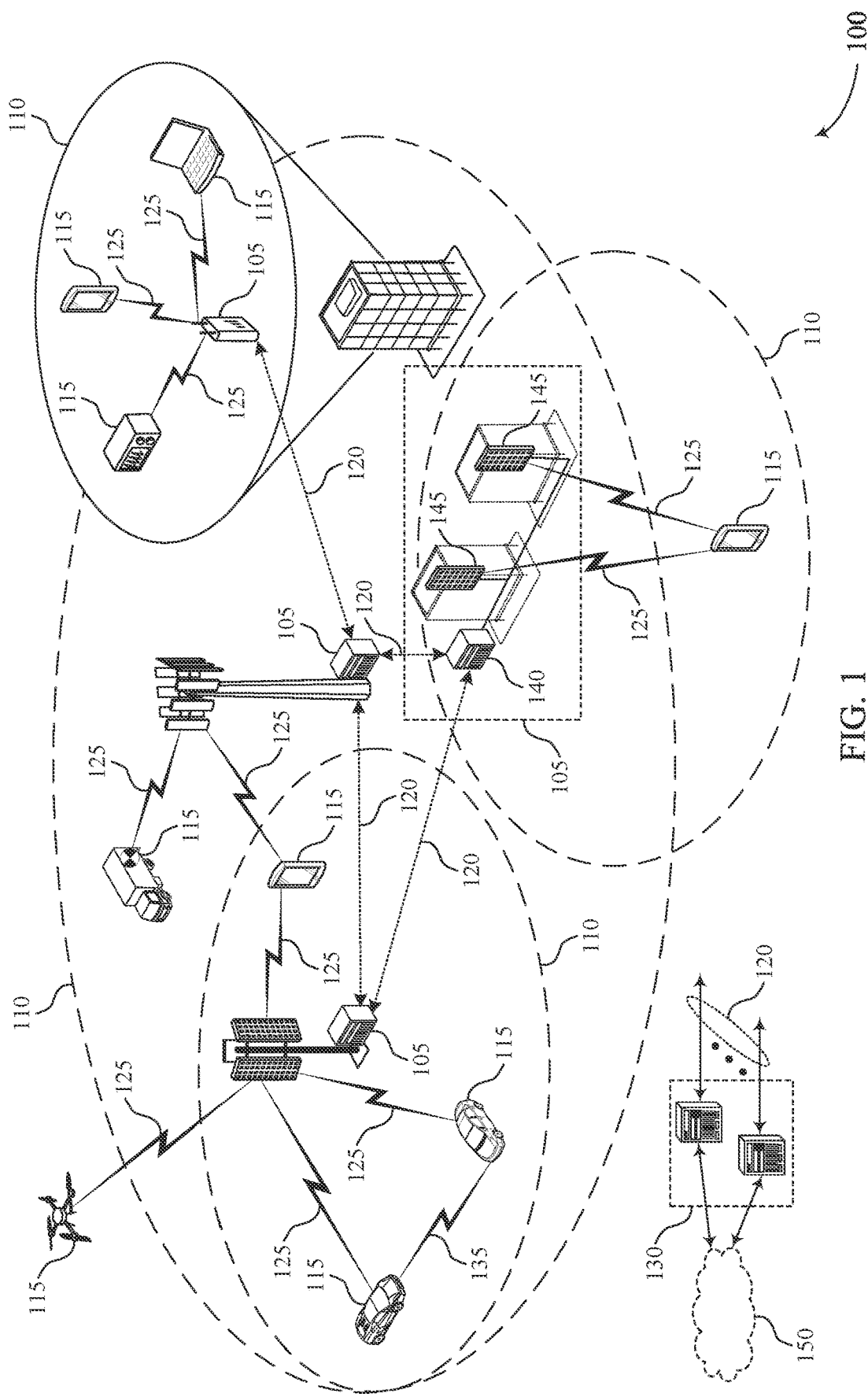
FIG. 1 illustrates an example of a system for wireless communications that supports resolving conflicting rate matching resource indications in accordance with aspects of the present disclosure.

A base station may allocate resources for downlink shared channel, such as a physical downlink shared channel (PDSCH), to a user equipment (UE). The downlink shared channel resource allocation may be based on a set of resource blocks in the frequency domain and a set of symbols in the time domain. In some cases, the downlink shared channel resource allocation may be configured semi-statically, semi-persistently, or dynamically by downlink control information (DCI). In some cases, the network may reserve a part of the downlink shared channel resource allocation for other purposes. For example, a base station may configure a rate matching resource within the downlink shared channel resource allocation. If rate matching is enabled, the base station may transmit downlink shared channel signaling on the downlink shared channel resource allocation except for the rate matching resource, which may then be used for other signaling or channels. By using rate matching, the wireless communications system may improve flexibility for concurrent scheduling of different signals and channels.

In some cases, the UE may receive multiple rate matching resource indications. However, in some cases, the UE may receive conflicting rate matching resource indications. For example, a first rate matching resource and a second rate matching resource may include some overlapping resource elements. If a first indication for the first rate matching resource indicates that the overlapping resources are available for the downlink shared channel and a second indication indicates that the overlapping resources are not available, the UE may be indicated that the overlapping resources are both available and unavailable at the same time. If the UE rate matches the overlap, this may reduce throughput for the UE or cause reception failure for data on the downlink shared channel. If the UE does monitor the overlap, the UE may receive signaling not intended for the UE, which may also cause reception failure for the UE.

By implementing the techniques described, a UE may resolve conflicting rate matching resource indications. The UE may be configured with a set of rules for resolving conflicting rate matching resource indications. In some cases, the UE may rate match the overlapping resources. In some cases, the UE may monitor the overlap to receive the downlink shared channel. In some cases, the base station may indicate whether the UE is to monitor or rate match the overlap. The UE may resolve the conflicting indication to prevent downlink shared channel loss and communications failures. Various examples of conflicting indications and resolutions to these conflicts are described herein.

Aspects of the disclosure are initially described in the context of wireless communications systems. Aspects of the disclosure are further illustrated by and described with reference to apparatus diagrams, system diagrams, and flowcharts that relate to resolving conflicting rate matching resource indications.

FIG. 1 illustrates an example of a wireless communications system 100 that supports resolving conflicting rate matching resource indications in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs. or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5 GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

A base station 105 may allocate resources for PDSCH to a UE 115. In some cases, the network may reserve a part of the PDSCH resource allocation for other purposes. For example, a base station 105 may configure a rate matching resource within the PDSCH resource allocation. If rate matching is enabled, the base station 105 may transmit downlink shared channel signaling on the downlink shared channel resource allocation except for the rate matching resource, which may then be used for other signaling or channels. In some cases, the UE 115 may receive multiple rate matching resource indications. However, in some cases, the UE 115 may receive conflicting rate matching resource indications. For example, a first rate matching resource and a second rate matching resource may include some overlapping resource elements. If a first indication for the first rate matching resource indicates that the overlapping resources are available for the downlink shared channel and a second indication indicates that the overlapping resources are not available, the UE 115 may be indicated that the overlapping resources are both available and unavailable at the same time.

A UE 115 may resolve conflicting rate matching resource indications by implementing techniques described herein. In some cases, the UE 115 may be configured with a set of rules for resolving conflicting rate matching resource indications. In some examples, the UE 115 may resolve the conflicting rate matching resource indications according to one or more conflict resolution rules of the set of conflict resolution rules. According to a first conflict resolution rule, for example, the UE 115 may rate match the overlapping resources. In another example, according to a second conflict resolution rule, the UE 115 may monitor the overlap to receive PDSCH. In some cases, the base station 105 may indicate whether the UE 115 is to monitor or rate match the overlap. For example, the base station 105 may indicate a conflict resolution rule to the UE 115, and the UE 115 may resolve the conflict according to the indicated conflict resolution rule. The UE 115 may resolve the conflicting indication to prevent downlink shared channel loss and communications failures. Various examples of conflicting indications and resolutions to these conflicts are described herein, for example with reference to FIGS. 3 through 7. Some other indication conflict scenarios may also be resolved by implementing the techniques described herein.

Figure 2:
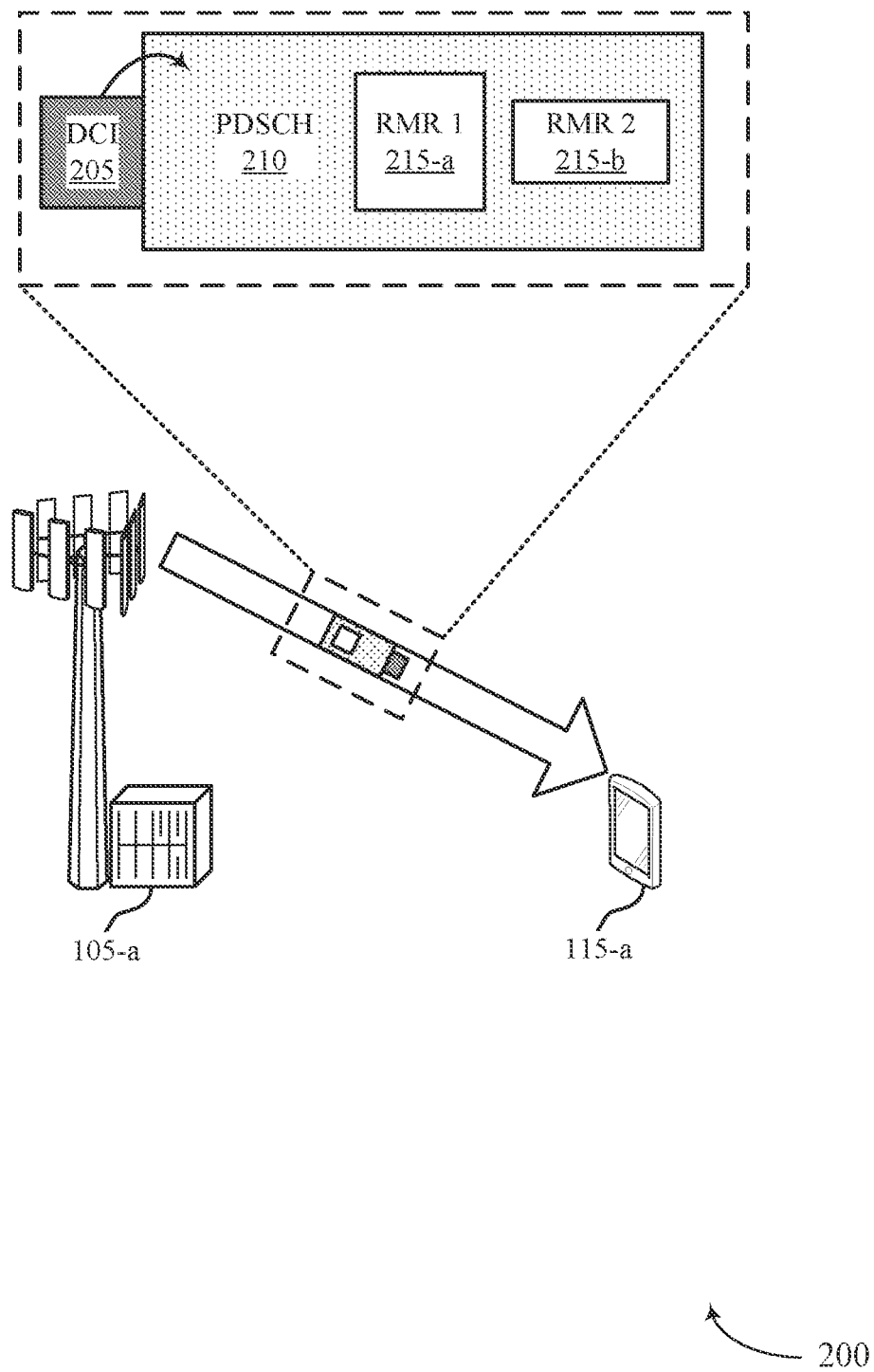
FIG. 2 illustrates an example of a wireless communications system that supports aspects of the present disclosure.

FIG. 2 illustrates an example of a wireless communications system 200 that supports resolving conflicting rate matching resource indications in accordance with aspects of the present disclosure. In some examples, the wireless communications system 200 may implement aspects of wireless communication system 100. The wireless communications system 200 includes UE 115-a and base station 105-a, which may be respective examples of a UE 115 and a base station 105 described with reference to FIG. 1. Base station 105-a may serve UE 115-a, allocating resources for UE 115-a and configuring UE 115-a to operate in the wireless communications system 200.

In some cases, base station 105-a may allocate resources for a downlink shared channel to UE 115-a. A PDSCH resource allocation 210 may be an example of a downlink shared channel resource allocation. The PDSCH resource allocation 210 may be based on a two-dimensional configuration (e.g., in time by frequency), with a set of resource blocks in the frequency domain and a set of symbols in the time domain. In some cases, the PDSCH resource allocation 210 may be configured semi-statically via semi-static RRC signaling, semi-persistently configured by RRC or jointly with DCI 205, or dynamically configured by DCI 205 scheduling the PDSCH resource allocation 210.

In some cases, the network may reserve a part of the PDSCH resource allocation 220 for other purposes. For example, the wireless communications system 200 enable a base station 105 to configure a rate matching resource 215 within the PDSCH resource allocation 220. If rate matching is enabled, base station 105-a may transmit downlink shared channel signaling on the PDSCH resource allocation 210 except for the rate matching resource 215. The rate matching resource 215 may be used for other signaling or channels. By using rate matching, the wireless communications system 200 may improve flexibility for concurrent scheduling of different signals and channels. When rate matching is enabled, modulated symbols of a channel with the enabled rate matching resource may be mapped to the resources assigned to the channel, except for the reserved resources, as though the reserved resources were not allocated to the channel.

Rate matching may be based on the rate matching resources 215. Base station 105-a may configure the rate matching resources 215, then indicate which rate matching resources are available for PDSCH reception by UE 115-a. For example, base station 105-a may configure UE 115-a with the PDSCH resource allocation 210 and two rate matching resources 215, including rate matching resource 215-a and rate matching resource 215-b. In some cases, base station 105-a may indicate that rate matching resource 215-a is available for PDSCH, but rate matching resource 215-b is not available for PDSCH. UE 115-a may then receive PDSCH signaling on rate matching resource 215-a and rate match around rate matching resource 215-b.

A rate matching resource 215 may be configured at a resource element-level or at a resource block-level. For resource block-level rate matching resources, base station 105-a may indicate a resource block bitmap, a symbol bitmap in one or two slots, and a pattern (e.g., periodicity and location) where the resource block bitmap and symbol bitmap are applied.

In some cases, UE behavior for a resource block level rate matching resource may be dynamically indicated. Base station 105-a may configure rate matching pattern groups, and each group may include at least one resource block level rate matching resource. For example, base station 105-a may configure one or two rate matching pattern groups, and a resource block level rate matching resource may be included in one or two of the configured groups. Base station 105-a may use one or two bits (e.g., or however many groups there are configured) in scheduling DCI to indicate whether rate matching resources in a group are available for PDSCH (e.g., no rate matching in the rate matching resource 215) or not available for PDSCH (e.g., rate matching is performed in the rate matching resource 215).

In some cases, UE behavior for a resource block level rate matching resource may be semi-statically indicated. For example, if a rate matching resource 215 is semi-statically configured, but not included in any of the configured groups, the rate matching resource 215 may not be available for PDSCH scheduled by the DCI that includes the dynamic indication.

For a resource element level rate matching resource, certain resource elements in a resource block may not be available for PDSCH. In some cases, there may be multiple types of resource element level rate matching resources, for example, a resource level rate matching resource may be indicated based on a cell-specific reference signal (CRS), such as an LTE CRS. Resource element level rate matching resources configured based on LTE CRS may be semi-statically indicated. For example, as long as the LTE CRS-based rate matching resource is configured, the UE 115 may perform rate matching in the LTE CRS-based rate matching resource.

A resource element level rate matching resource may also be configured based on a channel state information reference signal (CSI-RS). For CSI-RS based rate matching resources, the rate matching operation may be semi-statically indicated as a periodic resource (e.g., via RRC), semi-persistently indicated as a semi-persistent scheduling resource, or dynamically indicated as an aperiodic resource.

As long as a resource element-level rate matching resource is explicitly indicated, the rate matching resource may not be available for PDSCH. For example, the UE 115 may (e.g., by default) rate match the PDSCH in the indicated rate matching resource. By comparison, for some resource block level rate matching resources, the network may dynamically indicate a resource in a rate matching resource as available for PDSCH by the scheduling DCI of the PDSCH.

In some cases, UE 115-a may receive multiple rate matching resource indications. For example, UE 115-a may receive a first indication that a first rate matching resource 215 is available for UE 115-a to receive PDSCH and a second indication that a second rate matching resource 215 is not available. However, the first rate matching resource 215 and the second rate matching resource 215 may include some overlapping resource elements. Therefore, the first indication indicates that the overlapping resources are available for PDSCH, and the second indication indicates that the overlapping resources are not available, and that UE 115-a is to perform rate matching on the overlap. If UE 115-a rate matches the overlap, this may reduce throughput for UE 115-a or cause reception failure for data on the PDSCH. If UE 115-a does monitor the overlap, UE 115-a may receive signaling not intended for UE 115-a, which may cause reception failure for UE 115-a.

The wireless communications system 200 may implement techniques for resolving conflicting rate matching resource indications. UE 115-a may be configured with a set of rules for resolving conflicting rate matching resource indications. In some cases, UE 115-a may rate match the overlapping resources. In some cases, UE 115-a may monitor the overlapping resources to receive PDSCH. In some cases, base station 105-a may indicate whether UE 115-a is to monitor or rate match the overlap. UE 115-a may resolve the conflicting indication to prevent PDSCH loss and communications failures.

Figure 3:
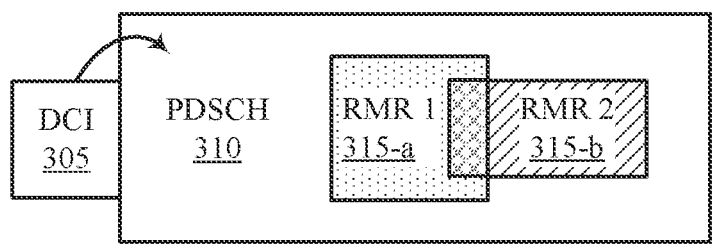
FIGS. 3 through 6 illustrate examples of rate matching resource indication conflict scenarios that support aspects of the present disclosure.
Figure 3:
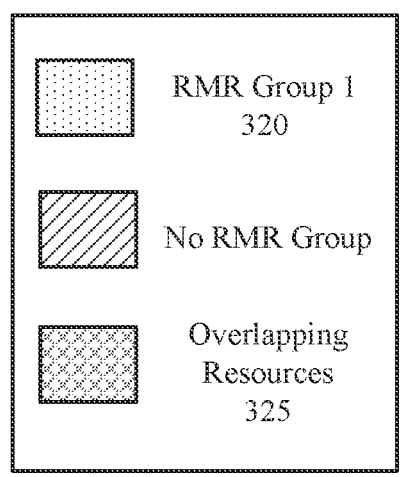

FIG. 3 illustrates an example of a rate matching resource indication conflict scenario 300 that supports aspects of the present disclosure. In some examples, the rate matching resource indication conflict scenario 300 may implement aspects of wireless communication system 100. As described with reference to FIG. 2, a base station 105 may configure a UE 115 with a PDSCH resource 310 and one or more rate matching resources 315. For example, the UE 115 may be configured with rate matching resource 315-a (e.g., RMR 1 315-a) and rate matching resource 315-b (e.g., RMR 2 315-b). There may be overlapping resources 325 included in first rate matching resource 315-a and rate matching resource 315-b.

In the rate matching resource indication conflict scenario 300, a resource element may be included in at least one resource block level rate matching resource (e.g., rate matching resource 315-a) of a rate matching pattern group 320 (e.g., RMR group 1 320). DCI 305, scheduling the PDSCH 310, may dynamically indicate that the rate matching pattern group 320 is available for the PDSCH 310.

The same resource element may be included in at least one resource block level rate matching resource (e.g., rate matching resource 315-b) that is not included in any rate matching pattern group. Therefore, based on being included in a rate matching resource 315 which is not included in a group, the resource element may also be indicated as not available for the PDSCH 310. This may conflict with the indication from the DCI 305, as the resource element may be indicated as both available to the UE 115 for the PDSCH 310 and not available to the UE 115 for the PDSCH 310. The UE 115 may apply a rate matching resource indication conflict resolution to determine whether to monitor or rate match the resource element.

In some examples of the rate matching resource indication conflict scenario 300, the UE 115 may determine the overlapping resources 325 is available for the PDSCH 310. For example, the dynamic indication included in the DCI 305 may be prioritized over the semi-static indication (e.g., configuring rate matching resource 315-b as not in a group). Therefore, the UE 115 may monitor the overlapping resources 325 for the PDSCH 310. In some cases, the overlapping resources 325 may not be available for the PDSCH. In this example, the semi-static indication may be prioritized. In this case, the UE 115 may be configured with fewer rate matching patterns, which may reduce complexity for the UE 115.

In some examples, the UE 115 may not expect to be configured with the rate matching resource indication conflict scenario 300. For example, the UE 115 may be configured with a set of scheduling constraints, where the UE 115 does not support a conflict or a scheduling overlap between a dynamic rate matching resource indication and a semi-static rate matching resource indication. The UE 115 may then check that resource assignments are scheduled according to the scheduling constraint prior to communicating. If the resource assignments are not valid according to the scheduling constraint, the UE 115 may send an indication to the base station of the scheduling error.

In some cases, the base station 105 may indicate a conflict resolution rule to the UE 115. For example, the base station 105 may indicate for the UE 115 that the overlapping resources 325 are available for the PDSCH 310. In some cases, the base station 105 may indicate for the UE 115 to rate match the overlapping resources 325. The conflict resolution rules may be indicated dynamically (e.g., with the DCI 305) or configured semi-statically (e.g., via RRC or triggered via MAC CE).

Figure 4:
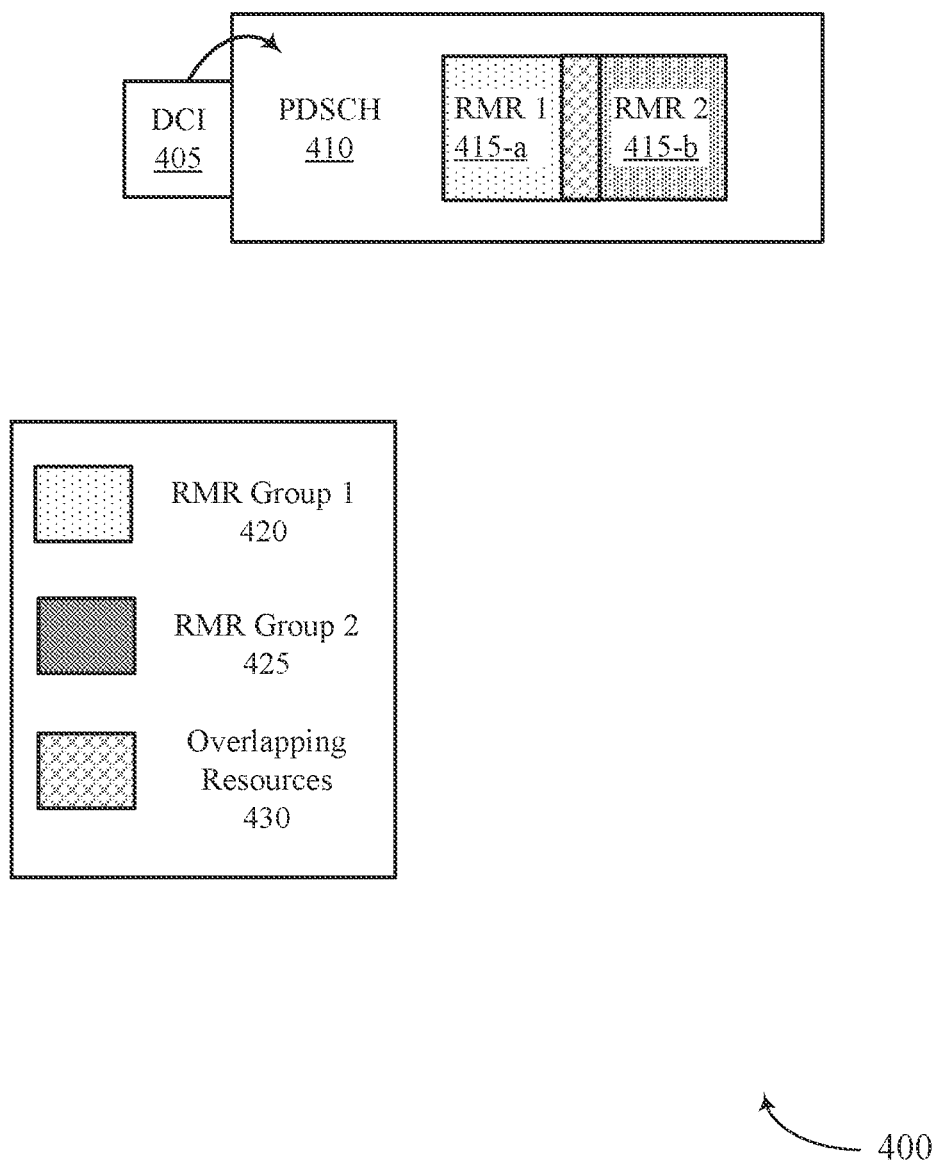

FIG. 4 illustrates an example of a rate matching resource indication conflict scenario 400 that supports aspects of the present disclosure. In some examples, the rate matching resource indication conflict scenario 400 may implement aspects of wireless communication system 100. As described with reference to FIG. 2, a base station 105 may configure a UE 115 with a PDSCH resource 410 and one or more rate matching resources 415. For example, the UE 115 may be configured with rate matching resource 415-a (e.g., RMR 1 415-a) and rate matching resource 415-b (e.g., RMR 2 415-b). There may be overlapping resources 430 included in each of rate matching resource 415-a and rate matching resource 415-b.

In the rate matching resource indication conflict scenario 400, a resource element may be included in at least one resource block level rate matching resource (e.g., rate matching resource 415-a) of a first rate matching pattern group 420 (e.g., RMR group 1 420). DCI 405, scheduling the PDSCH 410, may indicate that the first rate matching pattern group 420 is available for the PDSCH 410.

The same resource element may be included in at least one resource block level rate matching resource (e.g., rate matching resource 415-b) of a second rate matching pattern group 425 (e.g., RMR group 2 425). The DCI 405 may indicate that the second rate matching pattern group 425 is not available for the PDSCH 410. This may conflict with the indication included in the DCI 405 for the first rate matching pattern group 420, as the resource element may be indicated as both available for the PDSCH 410 and not available for the PDSCH 410. The UE 15 may apply a rate matching resource indication conflict resolution to determine whether to monitor or rate match the resource element.

In some examples of the rate matching resource indication conflict scenario 400, the UE 115 may determine whether to rate match or monitor the overlapping resource 430 for the PDSCH 410 based on a priority of the rate matching pattern groups. For example, the first rate matching pattern group 425 may be considered to have a higher priority than the second rate matching pattern group 425. The UE 115 may then follow the configuration for the first rate matching pattern group 425. In some cases, the UE 115 may be configured with which group to follow.

Additionally, or alternatively, the overlapping resources 430 may be considered to be available for the PDSCH 410 by the UE 115. For example, the UE 115 may be configured to prioritize receiving the PDSCH 410 over rate matching. In some cases, the overlapping resources 430 may not be available for the PDSCH 410. For example, the UE 115 may be configured to prioritize rate matching over monitoring for the PDSCH 410. In some cases, if the UE 115 is configured to rate match in this scenario, the UE 115 may be configured with fewer rate matching patterns, which may reduce complexity for the UE 115.

In some examples, the UE 115 may not expect to be configured with the rate matching resource indication conflict scenario 400. For example, the UE 115 may be configured with a set of scheduling constraints that prevent overlapping resource elements in rate matching resources. Therefore, the UE 115 may not support a conflict or a scheduling overlap between a dynamic rate matching resource indication and another dynamic matching resource indication. The UE 115 may check that resource assignments are scheduled according to the scheduling prior to communicating. If the resource assignments are not valid according to the scheduling constraint, the UE 115 may send an indication to the base station of the scheduling error.

In some cases, the base station 105 may indicate a conflict resolution rule to the UE 115. For example, the base station 105 may indicate for the UE 115 that the overlapping resource 430 is available for the PDSCH 410. In some cases, the base station 105 may indicate for the UE 115 to rate match the overlapping resources 430. The conflict resolution rules may be indicated dynamically (e.g., with the DCI 405) or configured semi-statically (e.g., via RRC or triggered via MAC CE).

In some cases, the first rate matching pattern group 420 and the second rate matching pattern group 425 may both include a rate matching resource 415. Therefore, in some cases, the same rate matching resource 415 may be indicated to be both available for the PDSCH 410 based on being included in the first rate matching pattern group 420 and unavailable for the PDSCH 410 based on being included in the second rate matching pattern group 425.

Figure 5:
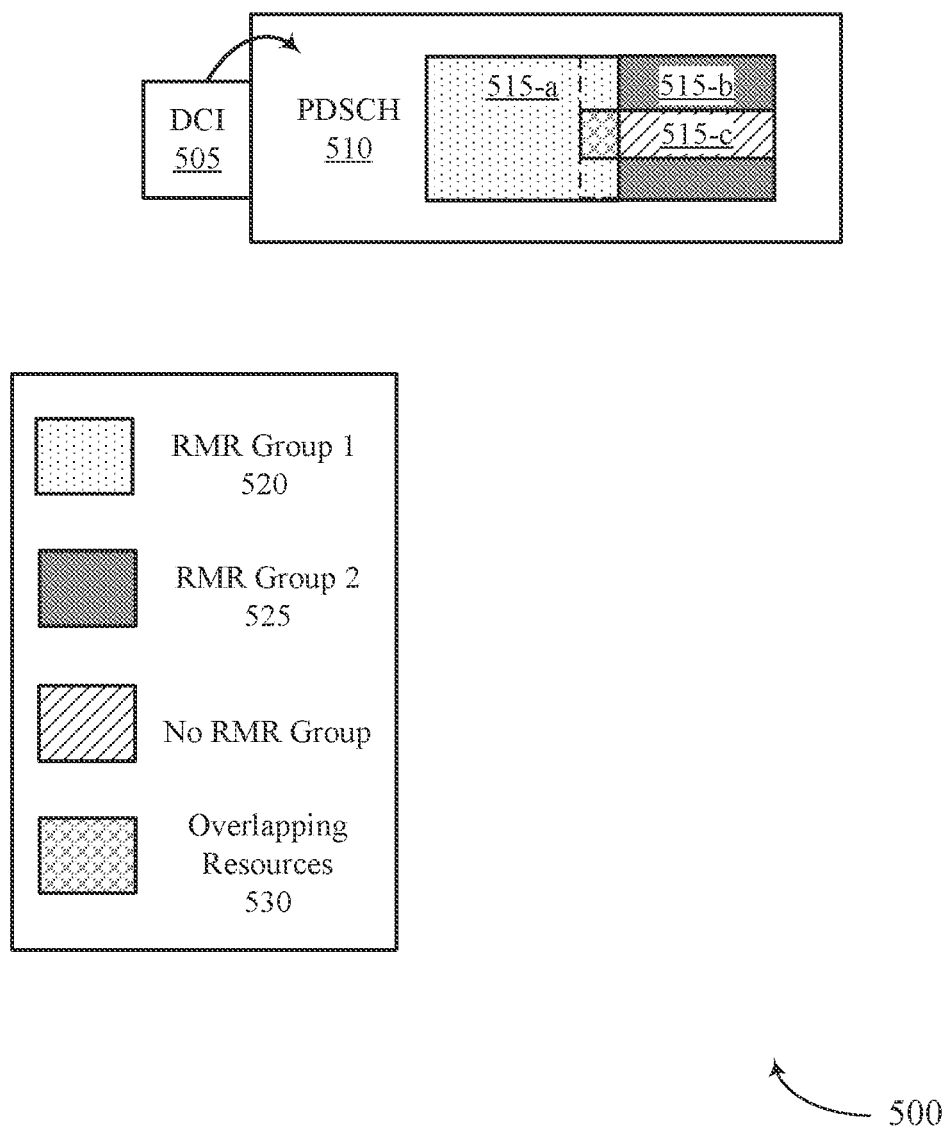

FIG. 5 illustrates an example of a rate matching resource indication conflict scenario 500 that supports aspects of the present disclosure. In some examples, rate matching resource indication conflict scenario 500 may implement aspects of wireless communication system 100. As described with reference to FIG. 2, a base station 105 may configure a UE 115 with a PDSCH resource 510 and one or more rate matching resources 515. For example, the UE 115 may be configured with rate matching resource 515-*a*, rate matching resource 515-*b*, and rate matching resource 515-*c*. There may be overlapping resources 530 included in each of rate matching resource 515-*a*, rate matching resource 515-*b*, and rate matching resource 515-*c*.

In the rate matching resource indication conflict scenario 500, a resource element may be included in at least one resource block level rate matching resource (e.g., rate matching resource 515-*a*) of a first rate matching pattern group 520 (e.g., RMR group 1 520). The same resource element may be included in at least one resource block level rate matching resource (e.g., rate matching resource 515-*b*) of a second rate matching pattern group 525 (e.g., RMR group 2 525). The resource element may also be included in a rate matching resource 515-*c*, which may not be included in any rate matching pattern group. Therefore, overlapping rate matching resource 515-*c*, which is not configured for any rate matching pattern group, the overlapping resources 530 may be indicated to not be available for the PDSCH 510. However, the DC 505 indicates that PDSCH 510 is available for rate matching pattern group 520 or rate matching pattern group 525, the UE 115 may have conflicting rate matching indications.

In some cases, both groups may be indicated as available for PDSCH 510. In this example, the rate matching resource indication conflict scenario 500 may be similar to the rate matching resource indication conflict scenario 300. Therefore, the techniques of the rate matching resource indication conflict scenario 300 may be applied.

If one group is dynamically indicated as available for PDSCH 510 and the other group is dynamically indicated as not available for the PDSCH 510, the UE 115 may determine how to resolve the indication conflict. In some case, the UE behavior (e.g., rate matching or monitoring PDSCH 510) may be determined based on the dynamic indication of the rate matching pattern groups. In some cases, the UE 115 behavior may be based on the groups. In some cases, the first rate matching patter group 520 and the second rate matching pattern group 525 may have different priorities, and the UE 115 may follow the UE behavior of the higher priority group. For example, the UE 115 may determine, or be configured, to follow the indications of the first rate matching pattern group 520, or the first rate matching pattern group 520 may have a higher priority. For example, the first rate matching pattern group 520 may have a higher priority than the second rate matching pattern group 525. Then, if the DCI 505 indicates that PDSCH is available for the first rate matching pattern group 520, the UE 115 may monitor the PDSCH 510 for the overlapping resources. If the first rate matching pattern group 520 is indicated to not be available for PDSCH 510, then the UE 115 may rate match the overlapping resources 530. In some cases, this example may be similar to techniques described with reference to the rate matching resource indication conflict scenario 400.

Additionally, or alternatively, the overlapping resources 530 may be considered to be available for the PDSCH 510 by the UE 115. For example, the UE 115 may be configured to prioritize receiving the PDSCH 510 over rate matching. In some cases, the overlapping resources 530 may not be available for the PDSCH 510. For example, the UE 115 may be configured to prioritize rate matching over monitoring for the PDSCH 510. In some cases, if the UE 115 is configured to rate match in this scenario, the UE 115 may be configured with fewer rate matching patterns, which may reduce complexity for the UE 115.

In some examples, the UE 115 may not expect to be configured with the rate matching resource indication conflict scenario 500. For example, the UE 115 may be configured with a set of scheduling constraints that prevent overlapping resource elements in rate matching resources. Therefore, the UE 115 may not support a conflict or a scheduling overlap between a dynamic rate matching resource indication and a semi-static rate matching resource indication or between a dynamic rate matching resource indication and another dynamic rate matching resource indication. The UE 115 may check that resource assignments are scheduled according to the scheduling prior to communicating. If the resource assignments are not valid according to the scheduling constraint, the UE 115 may send an indication to the base station of the scheduling error.

In some cases, the base station 105 may indicate a conflict resolution rule to the UE 115. For example, the base station 105 may indicate for the UE 115 that the overlapping resource 530 is available for the PDSCH 410. In some cases, the base station 105 may indicate for the UE 115 to rate match the overlapping resources 530. The conflict resolution rules may be indicated dynamically (e.g., with the DCI 505) or configured semi-statically (e.g., via RRC or triggered via MAC CE).

Figure 6:
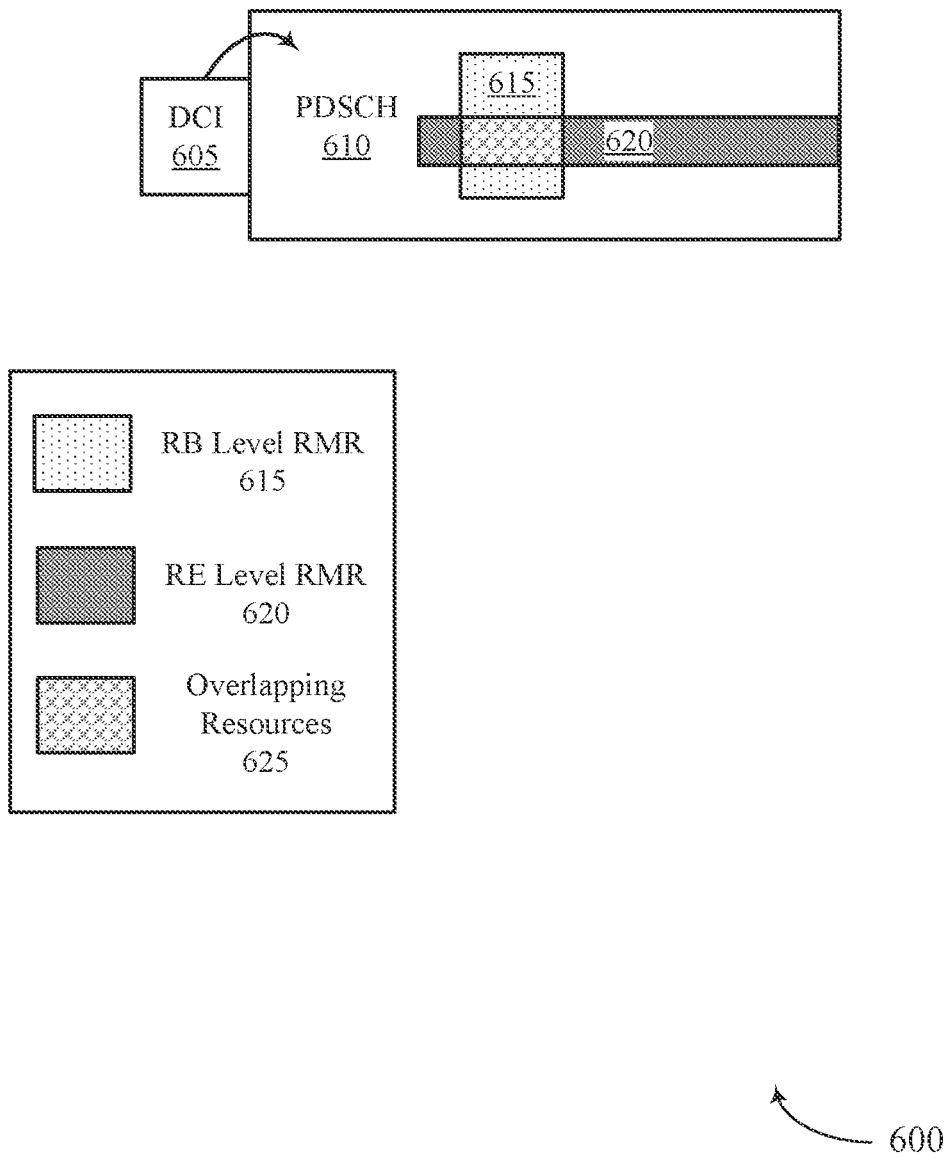

FIG. 6 illustrates an example of a rate matching resource indication conflict scenario 600 that supports aspects of the present disclosure. In some examples, the rate matching resource indication conflict scenario 600 may implement aspects of wireless communication system 100. As described with reference to FIG. 2, a base station 105 may configure a UE 115 with a PDSCH resource 610 and one or more rate matching resources. For example, the UE 115 may be configured with a resource block level rate matching resource 615 (e.g., RB level RMR 615) and a resource element level rate matching resource 620 (e.g., RE level RMR 620). There may be overlapping resources 325, with at last one resource element included in both the resource block level rate matching resource 615 and the resource element level rate matching resource 620.

In the rate matching resource indication conflict scenario 600, a resource element may be included in at least one resource block level rate matching resource 615 and at least one resource element level rate matching resource 620. DCI 605 may schedule the PDSCH 610 and include an indication that the resource block level rate matching resource 615 is available for the PDSCH 610. The UE 115 may determine that the resource element level rate matching resource, based on being configured at the resource element level, is not available for the PDSCH 610. This may conflict with the indication from the DCI 605, as the resource element may be determined to be both available to the UE 115 for the PDSCH 610 and not available to the UE 115 for the PDSCH 610. The UE 115 may apply a rate matching resource indication conflict resolution to determine whether to monitor or rate match the resource element.

In some examples of the rate matching resource indication conflict scenario 600, the UE 115 may determine the overlapping resources 625 are available for the PDSCH 610. For example, the UE may follow the resource block level indication. In some cases, resource block level indications may be prioritized over resource element level indications. In some cases, the UE 115 may determine that the overlapping resources 325 is not available for the PDSCH 610. In this example, the UE 115 may follow the resource element level rate matching resource indication. For example, semi-static configurations may be prioritized over dynamic indications.

In some examples, the UE 115 may not expect to be configured with the rate matching resource indication conflict scenario 600. For example, the UE 115 may be configured with a set of scheduling constraints, where the UE 115 is does not support a conflict or a scheduling overlap between a dynamic rate matching resource indication and a semi-static rate matching resource indication or between a resource block level indication and a resource element level indication. The UE 115 may then check that resource assignments are scheduling according by the scheduling constraint prior to communicating If the resource assignments are not valid according to the scheduling constraint, the UE 115 may send an indication to the base station of the scheduling error.

In some cases, the base station 105 may indicate a conflict resolution rule to the UE 115. For example, the base station 105 may indicate for the UE 115 that the overlapping resources 625 are available for the PDSCH 610. In some cases, the base station 105 may indicate for the UE 115 to rate match the overlapping resources 625. The conflict resolution rules may be indicated dynamically (e.g., with the DCI 605) or configured semi-statically (e.g., via RRC or triggered via MAC CE).

Figure 7:
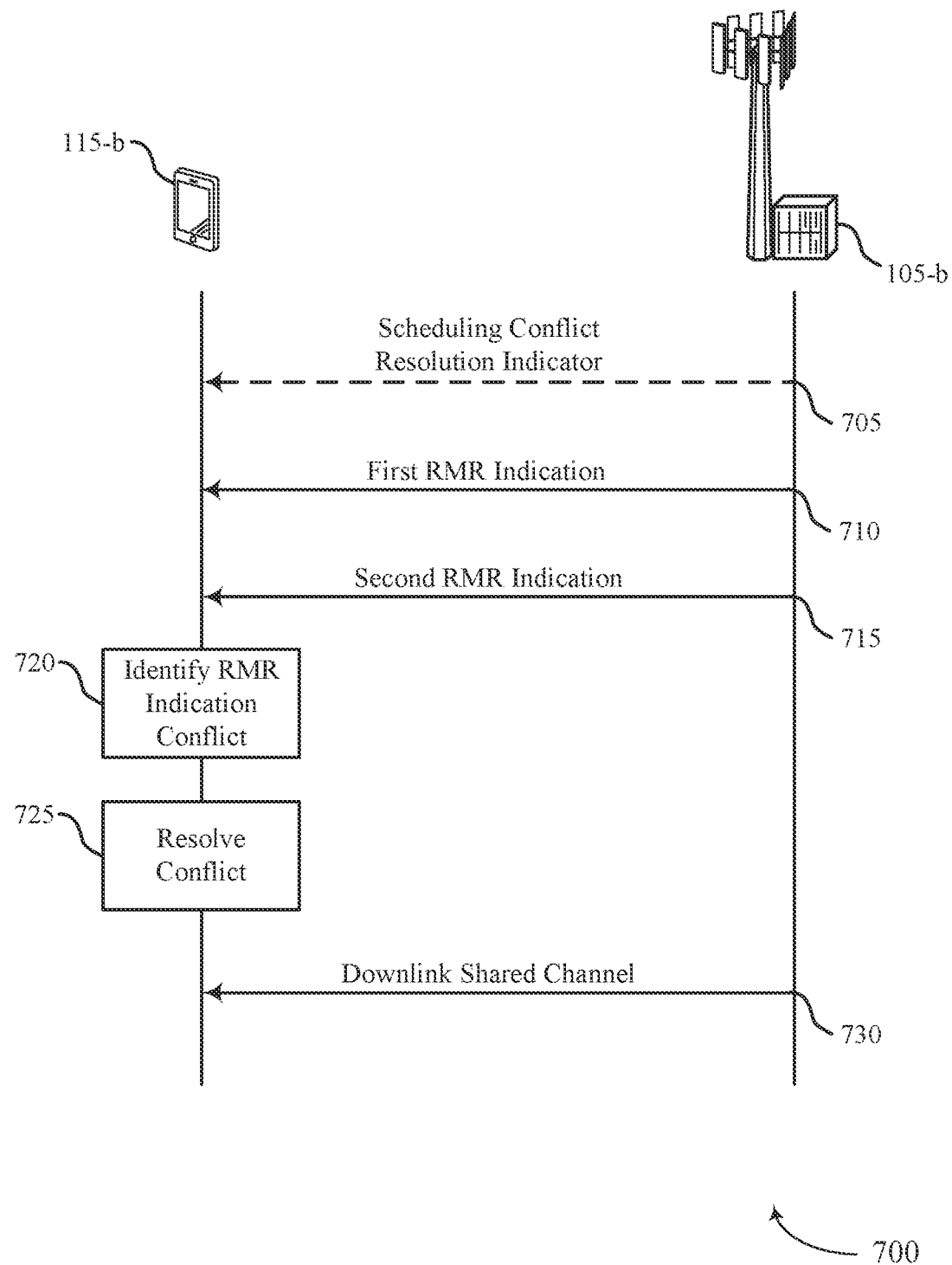
FIG. 7 illustrates an example of a process flow that supports aspects of the present disclosure.

FIG. 7 illustrates an example of a process flow 700 that supports aspects of the present disclosure. In some examples, process flow 700 may implement aspects of wireless communication system 100. Process flow 700 may include UE 115-*b* and base station 105-*b*, which may be respective examples of a UE 115 and a base station 105 described with reference to at least FIGS. 1 and 2.

UE 115-*b* may be configured with a PDSCH resource. UE 115-*b* may also be configured with one or more rate matching resources, which may at least partially overlap the PDSCH resource. In some cases, the rate matching resources may be a resource block level rate matching resource which is included in a rate matching pattern group. UE 115-*b* may receive DCI scheduling the PDSCH resource, and the DCI may include whether the rate matching pattern group is available to UE 115-*b* for PDSCH. If the rate matching pattern group is not available, UE 115-*b* may rate match around the rate matching resources of the rate matching pattern group. Some other rate matching resources, such as rate matching resources which are not included in a rate matching pattern group or resource element level rate matching resources, may be considered as not available to UE 115-*b* for receiving PDSCH if configured. In some examples, one or more rate matching resources may overlap, and UE 115-*b* may be indicated conflicting indications of whether the overlapping resources are available for PDSCH reception.

For example, at 710, UE 115-*b* may receive a first rate matching resource indication that indicates that a first rate matching resource is available for use by UE 115-*a* in reception of a downlink shared channel. However, at 715, UE 115-*b* may receive a second rate matching resource indication that indicates that a second rate matching resource is not available for use by the UE in reception of the downlink shared channel.

At 720, UE 115-*b* may identify a rate matching resource indication conflict arising from an overlap of at least one resource element included in both the first rate matching resource and the second rate matching resource. Therefore, UE 115-*b* may resolve the rate matching resource indication conflict in accordance with a conflict resolution rule at 725. For example, UE 115-*b* may be configured with rate matching resource indications which correspond to a rate matching resource indication conflict as described with reference to one of FIGS. 3 through 6. Based on the indication conflict scenario, UE 115-*b* may resolve the conflict to either monitor the overlapping resources or to rate match the overlapping resources. In some cases, UE 115-*b* may determine whether to rate match or monitor based on whether UE 115-*b* received a dynamic indication or a semi-static indication. For example, UE 115-*b* may prioritize dynamic indications follow the dynamic indication to either rate match or monitor PDSCH. In some cases, rate matching resources, or rate matching pattern groups, may have different priorities, and UE 115-*b* may follow the indication from the highest priority rate matching resource or rate matching pattern group. At 730, base station 105-*b* may transmit one or more signals via the downlink shared channel in accordance with the conflict resolution rule.

In some cases, base station 105-*b* may send an indication of whether UE 115-*b* is to monitor for PDSCH on the overlap or rate match. For example, UE 115-*b* may receive, from base station 105-*b*, an indication of whether to monitor the at least one resource element for the downlink shared channel or to rate match around the at least one resource element, where the rate matching resource indication conflict is resolved based on the indication from the base station. In some cases, the indication may include a set of rate matching conflict resolution rules. These rules may be dynamically indicated (e.g., with scheduling DCI) or semi-statically configured (e.g., via RRC).

Figure 8:
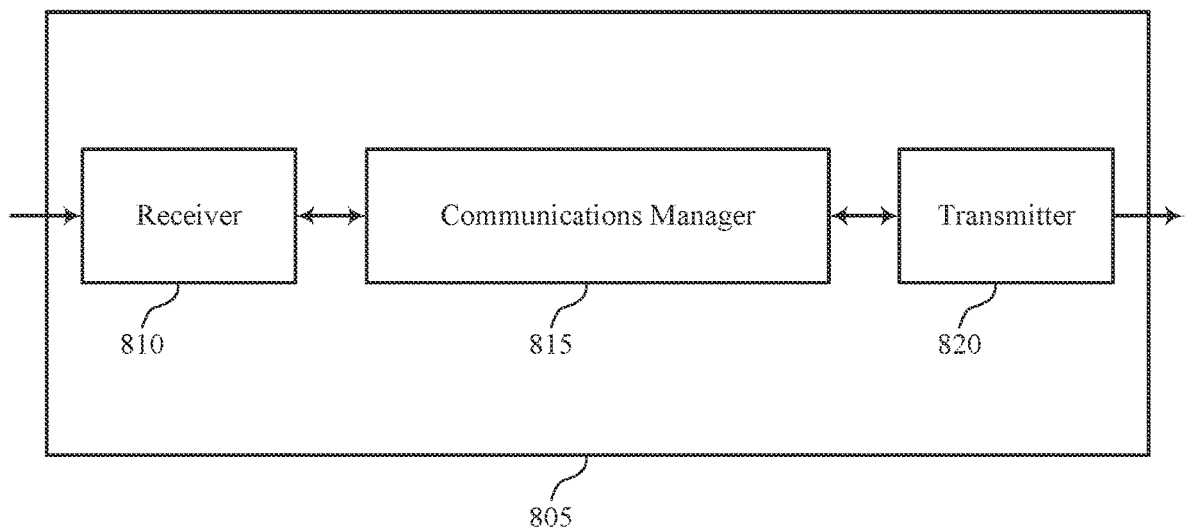
FIGS. 8 and 9 show block diagrams of devices that support resolving conflicting rate matching resource indications in accordance with aspects of the present disclosure.

FIG. 8 shows a block diagram 800 of a device 805 that supports aspects of the present disclosure. The device 805 may be an example of aspects of a UE 115 as described herein. The device 805 may include a receiver 810, a communications manager 815, and a transmitter 820. The device 805 may also include a processor. Each of these components may be in communication with one another (e.g., via one or more buses).

The receiver 810 may receive information such as packets, user data, or control information associated with various information channels (e.g., control channels, data channels, and information related to resolving conflicting rate matching resource indications, etc.). Information may be passed on to other components of the device 805. The receiver 810 may be an example of aspects of the transceiver 1120 described with reference to FIG. 11. The receiver 810 may utilize a single antenna or a set of antennas.

The communications manager 815 may receive a first rate matching resource indication that indicates that a first rate matching resource is available for use by the UE in reception of a downlink shared channel, receive a second rate matching resource indication that indicates that a second rate matching resource is not available for use by the UE in reception of the downlink shared channel, identify a rate matching resource indication conflict arising from an overlap of at least one resource element included in both the first rate matching resource and the second rate matching resource, and resolve the rate matching resource indication conflict in accordance with a conflict resolution rule. The communications manager 815 may also receive a first rate matching resource indication that indicates that a first rate matching resource is available for use by the UE in reception of a downlink shared channel, receive a second rate matching resource indication that indicates that a second rate matching resource is not available for use by the UE in reception of the downlink shared channel, determine that the first rate matching resource and the second rate matching resource are allocated in accordance with a scheduling constraint that prevents overlapping resource elements from the first rate matching resource and the second rate matching resource, and receive the downlink shared channel in accordance with the first rate matching resource indication, the second rate matching resource indication, and the scheduling constraint. The communications manager 815 may be an example of aspects of the communications manager 1110 described herein.

The communications manager 815, or its sub-components, may be implemented in hardware, code (e.g., software or firmware) executed by a processor, or any combination thereof. If implemented in code executed by a processor, the functions of the communications manager 815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 815, or its sub-components, may be physically located at various positions, including being distributed such that portions of functions are implemented at different physical locations by one or more physical components. In some examples, the communications manager 815, or its sub-components, may be a separate and distinct component in accordance with various aspects of the present disclosure. In some examples, the communications manager 815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The actions performed by the UE communications manager 815 as described herein may be implemented to realize one or more potential advantages. One implementation may allow a UE 15 to reduce transmission failures be ensuring that the UE 115 either receives an entire PDSCH allocation or that the UE 115 does not receive signaling intended for other devices. Additionally, or alternatively, the UE 115 may further improve PDSCH throughput by dynamically resolving conflicting rate matching resource indications to monitor PDSCH when available.

The transmitter 820 may transmit signals generated by other components of the device 805. In some examples, the transmitter 820 may be collocated with a receiver 810 in a transceiver module. For example, the transmitter 820 may be an example of aspects of the transceiver 1120 described with reference to FIG. 11. The transmitter 820 may utilize a single antenna or a set of antennas.

Figure 9:
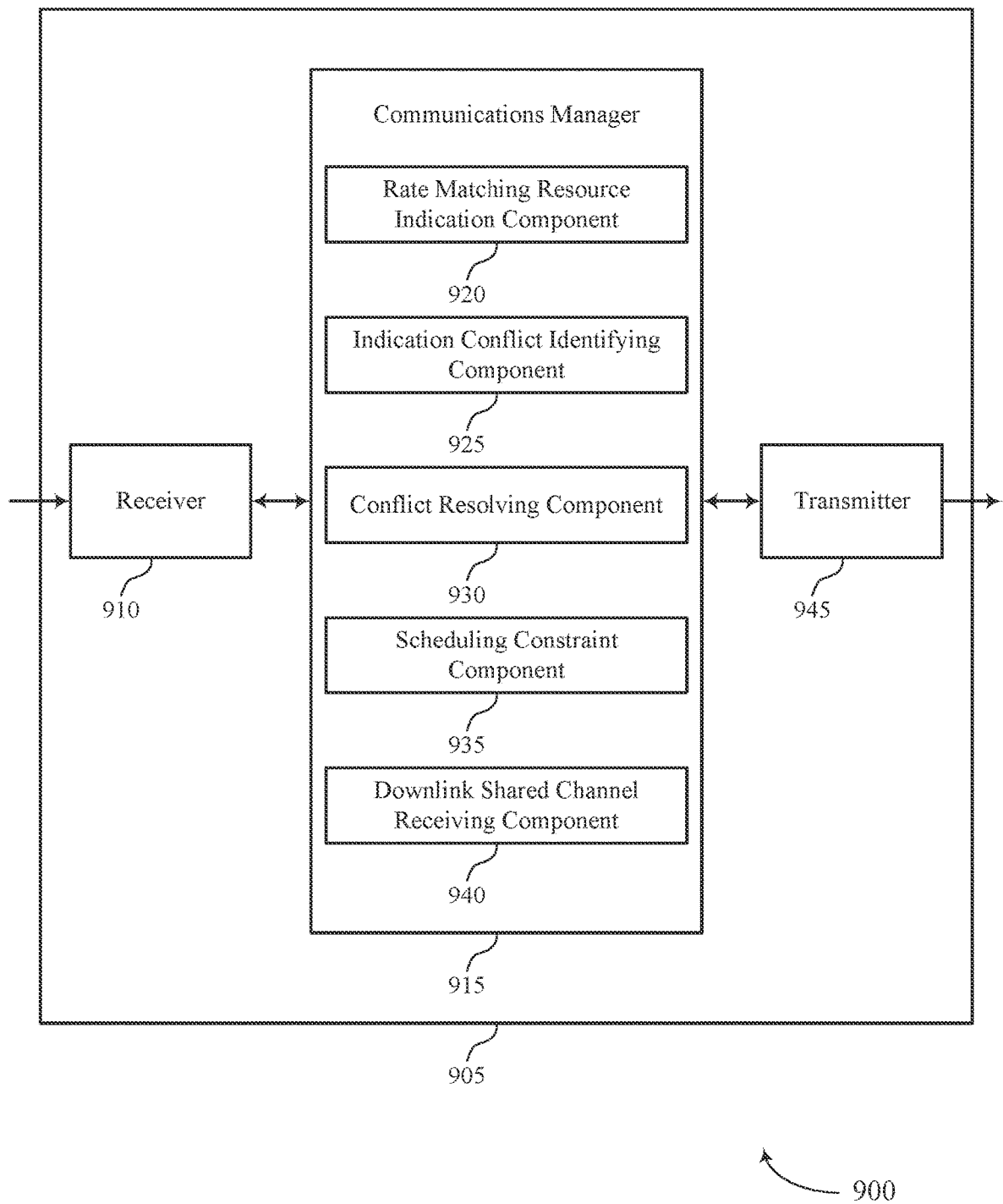

FIG. 9 shows a block diagram 900 of a device 905 that supports aspects of the present disclosure. The device 905 may be an example of aspects of a device 805, or a UE 115 as described herein. The device 905 may include a receiver 910, a communications manager 915, and a transmitter 945. The device 905 may also include a processor. Each of these components may be in communication with one another (e.g., via one or more buses).

The receiver 910 may receive information such as packets, user data, or control information associated with various information channels (e.g., control channels, data channels, and information related to resolving conflicting rate matching resource indications, etc.). Information may be passed on to other components of the device 905. The receiver 910 may be an example of aspects of the transceiver 1120 described with reference to FIG. 11. The receiver 910 may utilize a single antenna or a set of antennas.

The communications manager 915 may be an example of aspects of the communications manager 815 as described herein. The communications manager 915 may include a rate matching resource indication component 920, an indication conflict identifying component 925, a conflict resolving component 930, a scheduling constraint component 935, and a downlink shared channel receiving component 940. The communications manager 915 may be an example of aspects of the communications manager 1110 described herein.

The rate matching resource indication component 920 may receive a first rate matching resource indication that indicates that a first rate matching resource is available for use by the UE in reception of a downlink shared channel and receive a second rate matching resource indication that indicates that a second rate matching resource is not available for use by the UE in reception of the downlink shared channel. The indication conflict identifying component 925 may identify a rate matching resource indication conflict arising from an overlap of at least one resource element included in both the first rate matching resource and the second rate matching resource. The conflict resolving component 930 may resolve the rate matching resource indication conflict in accordance with a conflict resolution rule.

The rate matching resource indication component 920 may receive a first rate matching resource indication that indicates that a first rate matching resource is available for use by the UE in reception of a downlink shared channel and receive a second rate matching resource indication that indicates that a second rate matching resource is not available for use by the UE in reception of the downlink shared channel. The scheduling constraint component 935 may determine that the first rate matching resource and the second rate matching resource are allocated in accordance with a scheduling constraint that prevents overlapping resource elements from the first rate matching resource and the second rate matching resource. The downlink shared channel receiving component 940 may receive the downlink shared channel in accordance with the first rate matching resource indication, the second rate matching resource indication, and the scheduling constraint.

The transmitter 945 may transmit signals generated by other components of the device 905. In some examples, the transmitter 945 may be collocated with a receiver 910 in a transceiver module. For example, the transmitter 945 may be an example of aspects of the transceiver 1120 described with reference to FIG. 11. The transmitter 945 may utilize a single antenna or a set of antennas.

Figure 10:
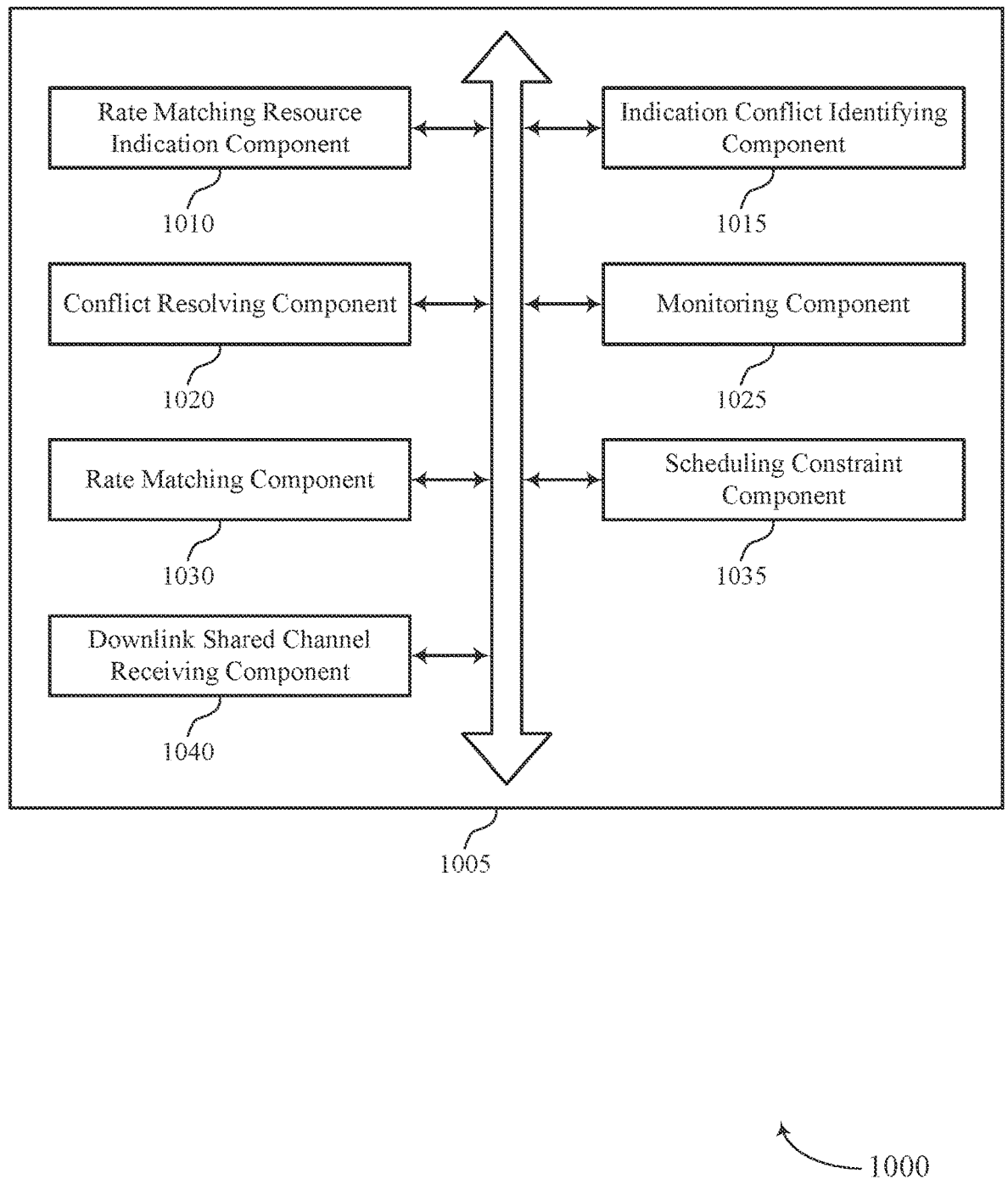
FIG. 10 shows a block diagram of a communications manager that supports resolving conflicting rate matching resource indications in accordance with aspects of the present disclosure.

FIG. 10 shows a block diagram 1000 of a communications manager 1005 that supports aspects of the present disclosure. The communications manager 1005 may be an example of aspects of a communications manager 815, a communications manager 915, or a communications manager 1110 described herein. The communications manager 1005 may include a rate matching resource indication component 1010, an indication conflict identifying component 1015, a conflict resolving component 1020, a monitoring component 1025, a rate matching component 1030, a scheduling constraint component 1035, and a downlink shared channel receiving component 1040. Each of these modules may communicate, directly or indirectly, with one another (e.g., via one or more buses).

The rate matching resource indication component 1010 may receive a first rate matching resource indication that indicates that a first rate matching resource is available for use by the UE in reception of a downlink shared channel. In some examples, the rate matching resource indication component 1010 may receive a second rate matching resource indication that indicates that a second rate matching resource is not available for use by the UE in reception of the downlink shared channel.

In some examples, the rate matching resource indication component 1010 may receive a first rate matching resource indication that indicates that a first rate matching resource is available for use by the UE in reception of a downlink shared channel. In some examples, the rate matching resource indication component 1010 may receive a second rate matching resource indication that indicates that a second rate matching resource is not available for use by the UE in reception of the downlink shared channel. In some cases, the first rate matching resource is included within a first rate matching pattern group.

In some cases, the downlink control information dynamically indicates that the third rate matching resource included within the second rate matching pattern group is not available for use by the UE in reception of the downlink shared channel. In some cases, the first rate matching resource indication includes a resource block-level indication that the first rate matching resource is available for use by the UE in reception of the downlink shared channel, and the second rate matching resource indication includes a resource element-level indication that the second rate matching resource is not available for use by the UE in reception of the downlink shared channel.

The indication conflict identifying component 1015 may identify a rate matching resource indication conflict arising from an overlap of at least one resource element included in both the first rate matching resource and the second rate matching resource. In some examples, the indication conflict identifying component 1015 may receive the first rate matching resource indication via downlink control information dynamically indicating that the first rate matching resource is available for use by the UE in reception of the downlink shared channel.

In some examples, the indication conflict identifying component 1015 may identify that the second rate matching resource indication indicates that the second rate matching resource is not included in any rate matching pattern groups for the UE. In some examples, the indication conflict identifying component 1015 may receive downlink control information dynamically indicating that the first rate matching resource included within a first rate matching pattern group is available for use by the UE in reception of the downlink shared channel, and the second rate matching resource included within a second rate matching pattern group is not available for use by the UE in reception of the downlink shared channel.

In some examples, the indication conflict identifying component 1015 may receive downlink control information dynamically indicating that the first rate matching resource that is included within a first rate matching pattern group is available for use by the UE in reception of the downlink shared channel, where the downlink control information also dynamically indicates a third rate matching resource included within a second rate matching pattern group that overlaps the first rate matching resource and the second rate matching resource by the at least one resource element. In some cases, the downlink control information dynamically indicates that the third rate matching resource included within the second rate matching pattern group is available for use by the UE in reception of the downlink shared channel.

The conflict resolving component 1020 may resolve the rate matching resource indication in accordance with a conflict resolution rule. In some examples, the conflict resolving component 1020 may monitor the at least one resource element for the downlink shared channel based on the dynamic indication and the conflict resolution rule.

In some examples, the conflict resolving component 1020 may rate match around the at least one resource element based on the conflict resolution rule. In some examples, the conflict resolving component 1020 may receive, from a base station, an indication of whether to monitor the at least one resource element for the downlink shared channel or to rate match around the at least one resource element, where the rate matching resource indication conflict is resolved based on the indication from the base station.

In some cases, the conflict resolution rule is based on a priority of the first rate matching pattern group and the second rate matching pattern group. In some cases, the conflict resolution rule is based on a priority of the first rate matching resource indication and the second rate matching resource indication. In some cases, the conflict resolution rule is based on a priority of the first rate matching pattern group, the second rate matching pattern group, and the third rate matching resource. In some cases, the conflict resolution rule is based on a priority of the first rate matching resource indication, the second rate matching resource indication, and a third rate matching resource indication that indicates the third rate matching resource.

The scheduling constraint component 1035 may determine that the first rate matching resource and the second rate matching resource are allocated in accordance with a scheduling constraint that prevents overlapping resource elements from the first rate matching resource and the second rate matching resource. The downlink shared channel receiving component 1040 may receive the downlink shared channel in accordance with the first rate matching resource indication, the second rate matching resource indication, and the scheduling constraint.

The monitoring component 1025 may monitor the at least one resource element for the downlink shared channel based on the dynamic indication and the conflict resolution rule. In some examples, the monitoring component 1025 may monitor the at least one resource element for the downlink shared channel based on the resource block-level indication. In some examples, the monitoring component 1025 may monitor the first rate matching resource for the downlink shared channel based on the scheduling constraint.

The rate matching component 1030 may rate match around the at least one resource element based on the conflict resolution rule. In some examples, the rate matching component 1030 may rate match around the at least one resource element based on the resource element-level indication. In some examples, the rate matching component 1030 may rate match around the second rate matching resource based on the scheduling constraint.

Figure 11:
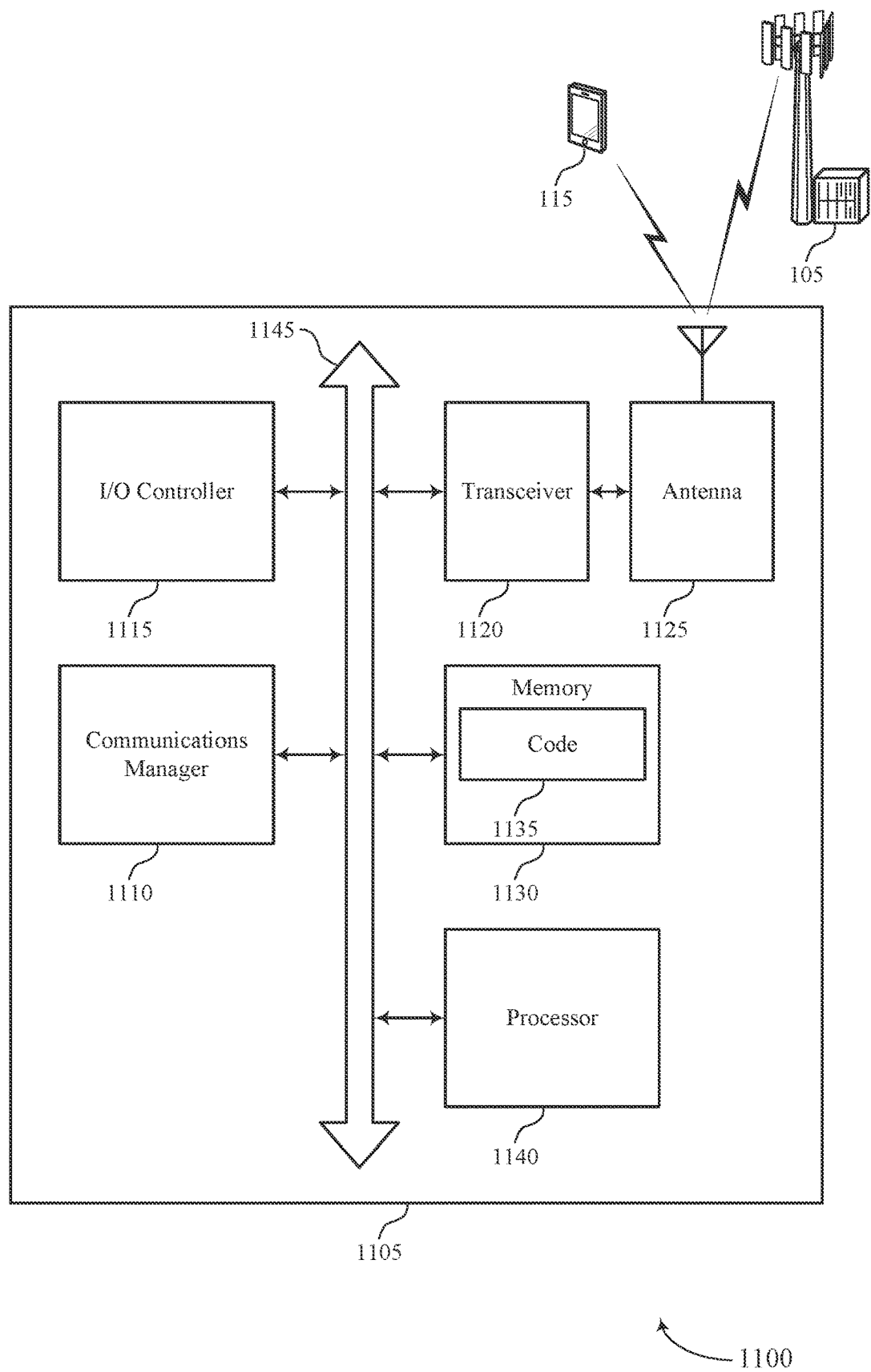
FIG. 11 shows a diagram of a system including a device that supports resolving conflicting rate matching resource indications in accordance with aspects of the present disclosure.

FIG. 11 shows a diagram of a system 1100 including a device 1105 that supports aspects of the present disclosure. The device 1105 may be an example of or include the components of device 805, device 905, or a UE 115 as described herein. The device 1105 may include components for bi-directional voice and data communications including components for transmitting and receiving communications, including a communications manager 1110, an I/O controller 1115, a transceiver 1120, an antenna 1125, memory 1130, and a processor 1140. These components may be in electronic communication via one or more buses (e.g., bus 1145).

The communications manager 1110 may receive a first rate matching resource indication that indicates that a first rate matching resource is available for use by the UE in reception of a downlink shared channel, receive a second rate matching resource indication that indicates that a second rate matching resource is not available for use by the UE in reception of the downlink shared channel, identify a rate matching resource indication conflict arising from an overlap of at least one resource element included in both the first rate matching resource and the second rate matching resource, and resolve the rate matching resource indication conflict in accordance with a conflict resolution rule. The communications manager 1110 may also receive a first rate matching resource indication that indicates that a first rate matching resource is available for use by the UE in reception of a downlink shared channel, receive a second rate matching resource indication that indicates that a second rate matching resource is not available for use by the UE in reception of the downlink shared channel, determine that the first rate matching resource and the second rate matching resource are allocated in accordance with a scheduling constraint that prevents overlapping resource elements from the first rate matching resource and the second rate matching resource, and receive the downlink shared channel in accordance with the first rate matching resource indication, the second rate matching resource indication, and the scheduling constraint.

The I/O controller 1115 may manage input and output signals for the device 1105. The I/O controller 1115 may also manage peripherals not integrated into the device 1105. In some cases, the I/O controller 1115 may represent a physical connection or port to an external peripheral. In some cases, the I/O controller 1115 may utilize an operating system such as iOS®, ANDROID®, MS-DOS®, MS-WINDOWS®1, OS/2®, UNIX®, LINUX®, or another known operating system. In other cases, the I/O controller 1115 may represent or interact with a modem, a keyboard, a mouse, a touchscreen, or a similar device. In some cases, the I/O controller 1115 may be implemented as part of a processor. In some cases, a user may interact with the device 1105 via the I/O controller 1115 or via hardware components controlled by the I/O controller 1115.

The transceiver 1120 may communicate bi-directionally, via one or more antennas, wired, or wireless links as described above. For example, the transceiver 1120 may represent a wireless transceiver and may communicate bi-directionally with another wireless transceiver. The transceiver 1120 may also include a modem to modulate the packets and provide the modulated packets to the antennas for transmission, and to demodulate packets received from the antennas.

In some cases, the wireless device may include a single antenna 1125. However, in some cases the device may have more than one antenna 1125, which may be capable of concurrently transmitting or receiving multiple wireless transmissions.

The memory 1130 may include RAM and ROM. The memory 1130 may store computer-readable, computer-executable code 1135 including instructions that, when executed, cause the processor to perform various functions described herein. In some cases, the memory 1130 may contain, among other things, a BIOS which may control basic hardware or software operation such as the interaction with peripheral components or devices.

The processor 1140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof).

In some cases, the processor 1140 may be configured to operate a memory array using a memory controller. In other cases, a memory controller may be integrated into the processor 1140. The processor 1140 may be configured to execute computer-readable instructions stored in a memory (e.g., the memory 1130) to cause the device 1105 to perform various functions (e.g., functions or tasks supporting resolving conflicting rate matching resource indications).

The code 1135 may include instructions to implement aspects of the present disclosure, including instructions to support wireless communications. The code 1135 may be stored in a non-transitory computer-readable medium such as system memory or other type of memory. In some cases, the code 1135 may not be directly executable by the processor 1140 but may cause a computer (e.g., when compiled and executed) to perform functions described herein.

Figure 12:
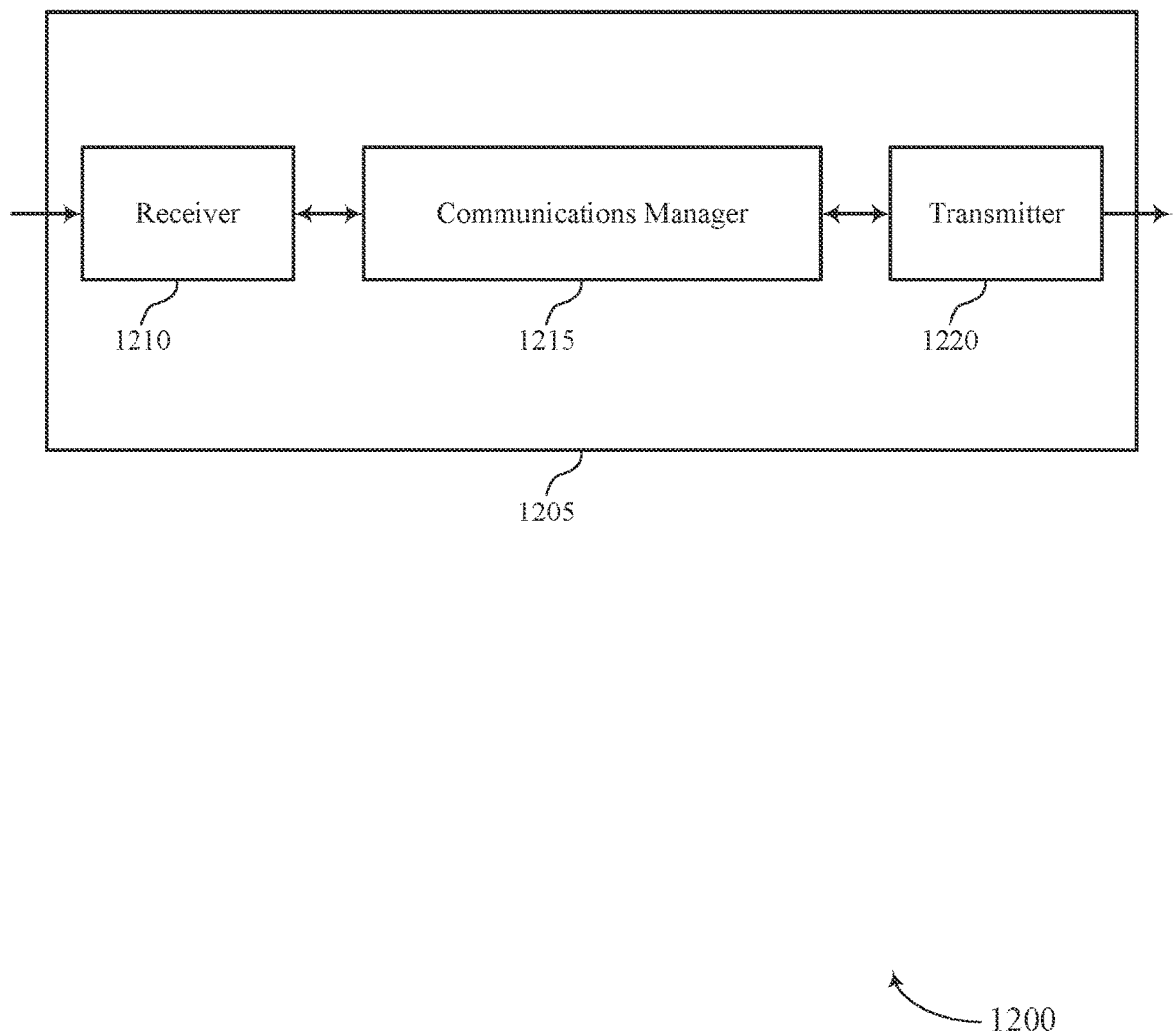
FIGS. 12 and 13 show block diagrams of devices that support resolving conflicting rate matching resource indications in accordance with aspects of the present disclosure.

FIG. 12 shows a block diagram 1200 of a device 1205 that supports aspects of the present disclosure. The device 1205 may be an example of aspects of a base station 105 as described herein. The device 1205 may include a receiver 1210, a communications manager 1215, and a transmitter 1220. The device 1205 may also include a processor. Each of these components may be in communication with one another (e.g., via one or more buses).

The receiver 1210 may receive information such as packets, user data, or control information associated with various information channels (e.g., control channels, data channels, and information related to resolving conflicting rate matching resource indications, etc.). Information may be passed on to other components of the device 1205. The receiver 1210 may be an example of aspects of the transceiver 1520 described with reference to FIG. 15. The receiver 1210 may utilize a single antenna or a set of antennas.

The communications manager 1215 may transmit a first rate matching resource indication that indicates to a UE that a first rate matching resource is available for use by the UE in reception of a downlink shared channel, transmit a second rate matching resource indication that indicates that a second rate matching resource is not available for use by the UE in reception of the downlink shared channel, identify a rate matching resource indication conflict arising from an overlap of at least one resource element included in both the first rate matching resource and the second rate matching resource, resolve the rate matching resource indication conflict in accordance with a conflict resolution rule, and transmit one or more signals via the downlink shared channel in accordance with the conflict resolution rule. The communications manager 1215 may be an example of aspects of the communications manager 1510 described herein.

The communications manager 1215, or its sub-components, may be implemented in hardware, code (e.g., software or firmware) executed by a processor, or any combination thereof. If implemented in code executed by a processor, the functions of the communications manager 1215, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1215, or its sub-components, may be physically located at various positions, including being distributed such that portions of functions are implemented at different physical locations by one or more physical components. In some examples, the communications manager 1215, or its sub-components, may be a separate and distinct component in accordance with various aspects of the present disclosure. In some examples, the communications manager 1215, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1220 may transmit signals generated by other components of the device 1205. In some examples, the transmitter 1220 may be collocated with a receiver 1210 in a transceiver module. For example, the transmitter 1220 may be an example of aspects of the transceiver 1520 described with reference to FIG. 15. The transmitter 1220 may utilize a single antenna or a set of antennas.

Figure 13:
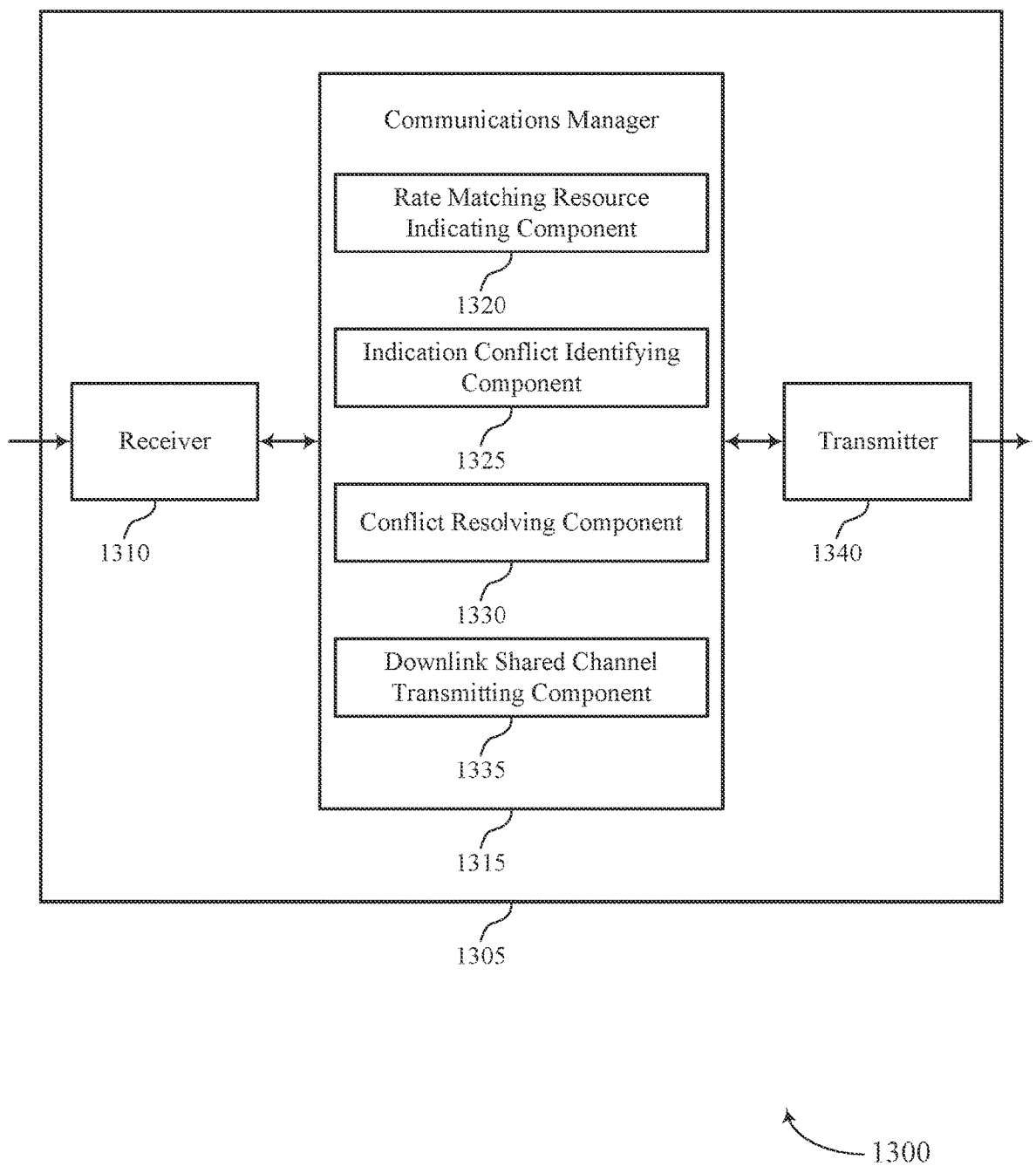

FIG. 13 shows a block diagram 1300 of a device 1305 that supports aspects of the present disclosure. The device 1305 may be an example of aspects of a device 1205, or a base station 105 as described herein. The device 1305 may include a receiver 1310, a communications manager 1315, and a transmitter 1340. The device 1305 may also include a processor. Each of these components may be in communication with one another (e.g., via one or more buses).

The receiver 1310 may receive information such as packets, user data, or control information associated with various information channels (e.g., control channels, data channels, and information related to resolving conflicting rate matching resource indications, etc.). Information may be passed on to other components of the device 1305. The receiver 1310 may be an example of aspects of the transceiver 1520 described with reference to FIG. 15. The receiver 1310 may utilize a single antenna or a set of antennas.

The communications manager 1315 may be an example of aspects of the communications manager 1215 as described herein. The communications manager 1315 may include a rate matching resource indicating component 1320, an indication conflict identifying component 1325, a conflict resolving component 1330, and a downlink shared channel transmitting component 1335. The communications manager 1315 may be an example of aspects of the communications manager 1510 described herein.

The rate matching resource indicating component 1320 may transmit a first rate matching resource indication that indicates to a UE that a first rate matching resource is available for use by the UE in reception of a downlink shared channel and transmit a second rate matching resource indication that indicates that a second rate matching resource is not available for use by the UE in reception of the downlink shared channel. The indication conflict identifying component 1325 may identify a rate matching resource indication conflict arising from an overlap of at least one resource element included in both the first rate matching resource and the second rate matching resource. The conflict resolving component 1330 may resolve the rate matching resource indication conflict in accordance with a conflict resolution rule.

The downlink shared channel transmitting component 1335 may transmit one or more signals via the downlink shared channel in accordance with the conflict resolution rule.

The transmitter 1340 may transmit signals generated by other components of the device 1305. In some examples, the transmitter 1340 may be collocated with a receiver 1310 in a transceiver module. For example, the transmitter 1340 may be an example of aspects of the transceiver 1520 described with reference to FIG. 15. The transmitter 1340 may utilize a single antenna or a set of antennas.

Figure 14:
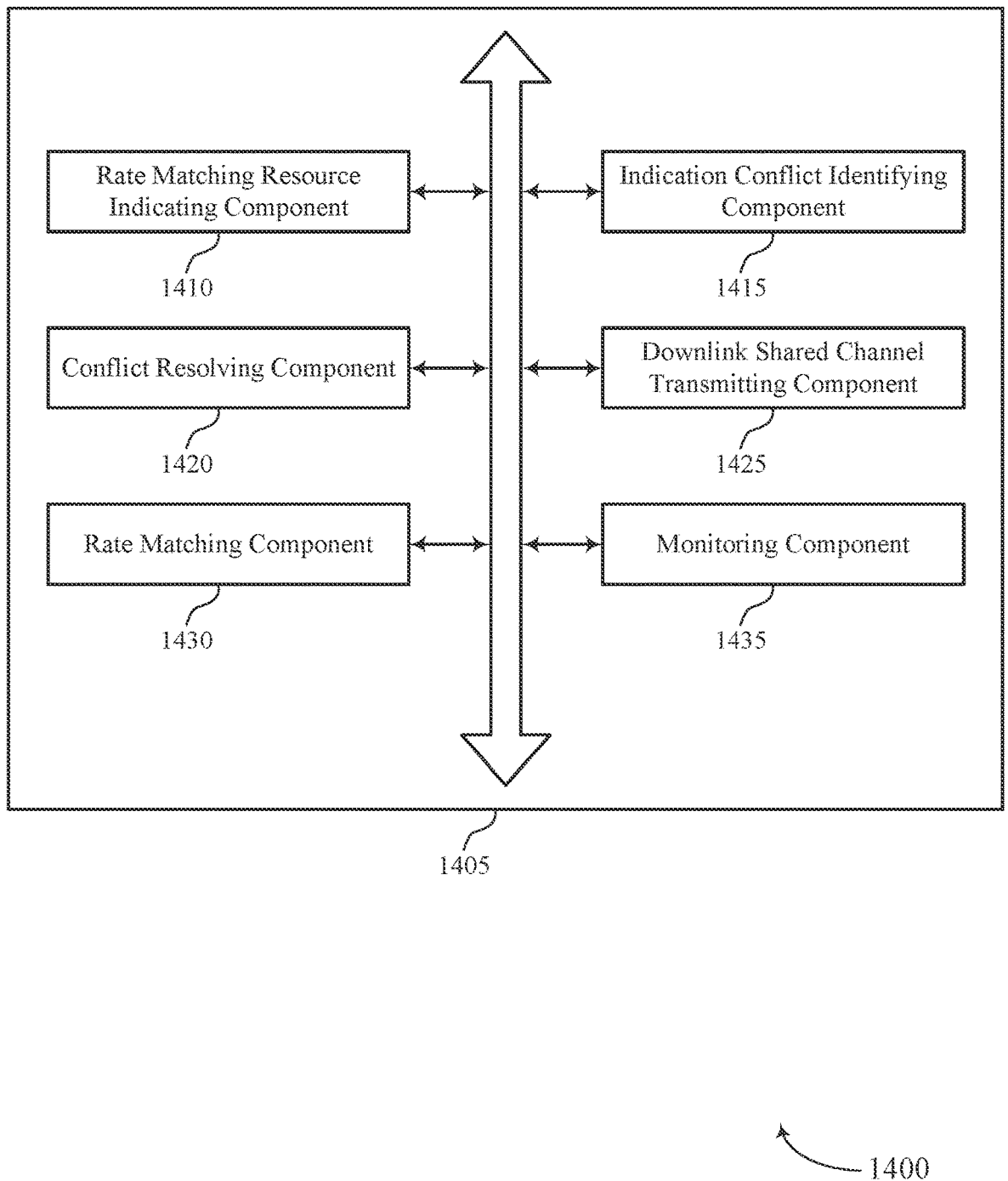
FIG. 14 shows a block diagram of a communications manager that supports resolving conflicting rate matching resource indications in accordance with aspects of the present disclosure.

FIG. 14 shows a block diagram 1400 of a communications manager 1405 that supports aspects of the present disclosure. The communications manager 1405 may be an example of aspects of a communications manager 1215, a communications manager 1315, or a communications manager 1510 described herein. The communications manager 1405 may include a rate matching resource indicating component 1410, an indication conflict identifying component 1415, a conflict resolving component 1420, a downlink shared channel transmitting component 1425, a rate matching component 1430, and a monitoring component 1435. Each of these modules may communicate, directly or indirectly, with one another (e.g., via one or more buses).

The rate matching resource indicating component 1410 may transmit a first rate matching resource indication that indicates to a UE that a first rate matching resource is available for use by the UE in reception of a downlink shared channel. In some examples, the rate matching resource indicating component 1410 may transmit a second rate matching resource indication that indicates that a second rate matching resource is not available for use by the UE in reception of the downlink shared channel. In some cases, the first rate matching resource indication includes a resource element-level indication that the first rate matching resource is available for use by the UE in reception of the downlink shared channel, and the second rate matching resource indication includes a resource block-level indication that the second rate matching resource is not available for use by the UE in reception of the downlink shared channel.

The indication conflict identifying component 1415 may identify a rate matching resource indication conflict arising from an overlap of at least one resource element included in both the first rate matching resource and the second rate matching resource. In some examples, the indication conflict identifying component 1415 may transmit the first rate matching resource indication via downlink control information dynamically indicating that the first rate matching resource is available for use by the UE in reception of the downlink shared channel.

In some examples, the indication conflict identifying component 1415 may identify that the second rate matching resource indication indicates that the second rate matching resource is not included in any rate matching pattern groups for the UE. In some examples, the indication conflict identifying component 1415 may transmit downlink control information dynamically indicating that the first rate matching resource included within a first rate matching pattern group is available for use by the UE in reception of the downlink shared channel, and the second rate matching resource included within a second rate matching pattern group is not available for use by the UE in reception of the downlink shared channel.

In some examples, the indication conflict identifying component 1415 may transmit downlink control information dynamically indicating that the first rate matching resource included within a first rate matching pattern group is available for use by the UE in reception of the downlink shared channel, where the downlink control information also dynamically indicates a third rate matching resource included within a second rate matching pattern group that overlaps the first rate matching resource and the second rate matching resource by the at least one resource element. In some examples, the indication conflict identifying component 1415 may identify that the second rate matching resource indication indicates that the second rate matching resource is not included in any rate matching pattern groups for the UE.

The conflict resolving component 1420 may resolve the rate matching resource indication conflict in accordance with a conflict resolution rule. In some examples, the conflict resolving component 1420 may transmit an indication that configures the UE to monitor the at least one resource element for the downlink shared channel based on the dynamic indication and the conflict resolution rule. In some examples, the conflict resolving component 1420 may transmit an indication that configures the UE to rate match around the at least one resource element based on the conflict resolution rule.

In some examples, the conflict resolving component 1420 may transmit an indication that configures the UE to monitor or rate match based on a priority of the first rate matching pattern group and the second rate matching pattern group. In some examples, the conflict resolving component 1420 may transmit an indication that configures the UE to monitor the at least one resource element for the downlink shared channel based on the resource block-level indication.

In some examples, the conflict resolving component 1420 may transmit an indication that configures the UE to rate match around the at least one resource element based on the resource element-level indication. In some cases, the conflict resolution rule is based on a priority of the first rate matching resource indication and the second rate matching resource indication. In some cases, the downlink control information dynamically indicates that the third rate matching resource included within the second rate matching pattern group is available for use by the UE in reception of the downlink shared channel.

In some cases, the conflict resolution rule is based on a priority of the first rate matching pattern group, the second rate matching pattern group, and the third rate matching pattern group. In some cases, the conflict resolution rule is based on a priority of the first rate matching resource indication, the second rate matching resource indication, and a third rate matching resource indication that indicates the third rate matching resource.

The downlink shared channel transmitting component 1425 may transmit one or more signals via the downlink shared channel in accordance with the conflict resolution rule. In some examples, the downlink shared channel transmitting component 1425 may transmit the downlink shared channel on the at least one resource element based on the dynamic indication and the conflict resolution rule.

The rate matching component 1430 may rate match around the at least one resource element based on the conflict resolution rule. The monitoring component 1435 may rate match around the at least one resource element based on the conflict resolution rule. In some cases, the downlink control information dynamically indicates that the third rate matching resource included within the second rate matching pattern group is not available for use by the UE in reception of the downlink shared channel. In some cases, the first rate matching resource indication includes a resource element-level indication that the first rate matching resource is available for use by the UE in reception of the downlink shared channel, and the second rate matching resource indication includes a resource block-level indication that the second rate matching resource is not available for use by the UE in reception of the downlink shared channel.

Figure 15:
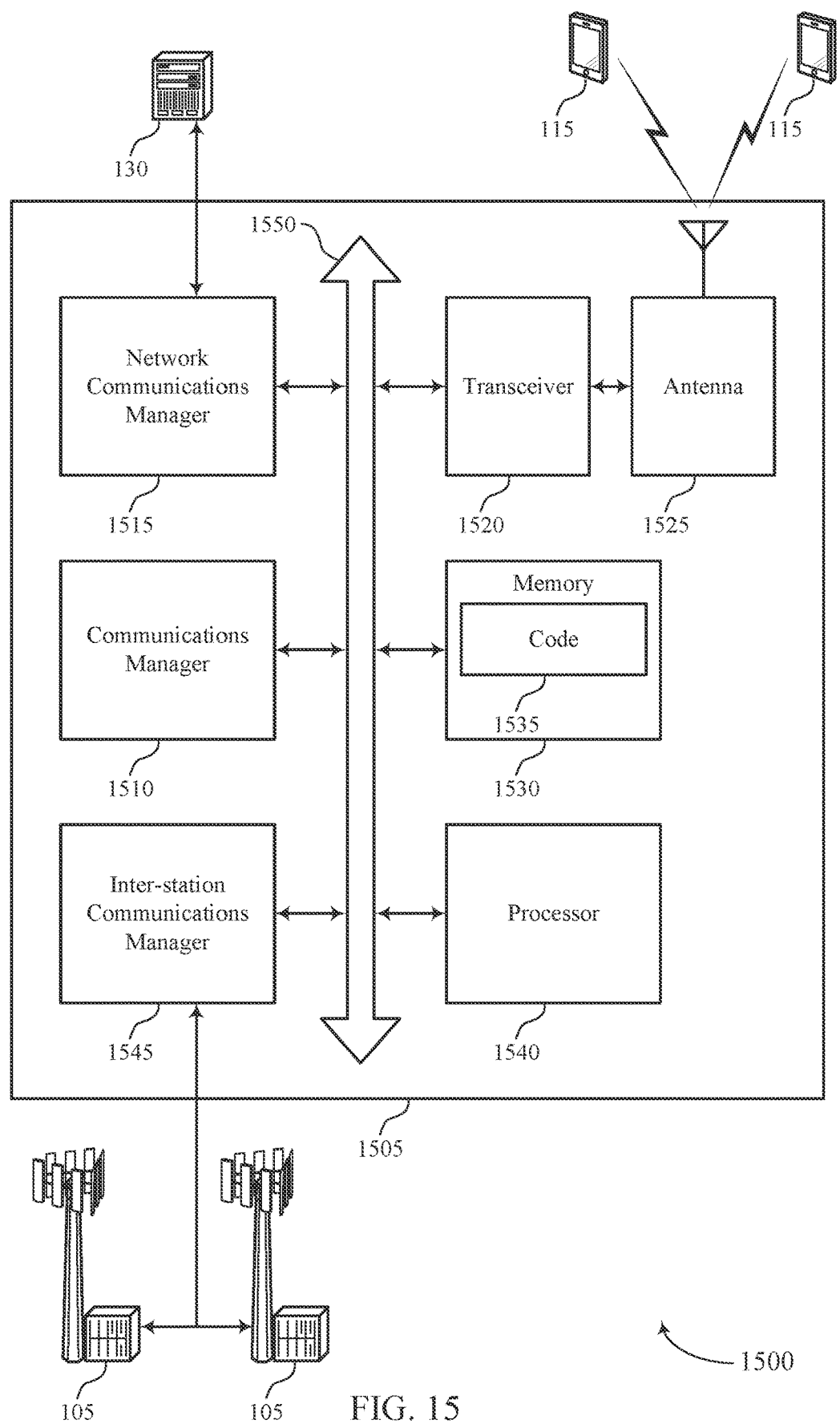
FIG. 15 shows a diagram of a system including a device that supports resolving conflicting rate matching resource indications in accordance with aspects of the present disclosure.

FIG. 15 shows a diagram of a system 1500 including a device 1505 that supports aspects of the present disclosure. The device 1505 may be an example of or include the components of device 1205, device 1305, or a base station 105 as described herein. The device 1505 may include components for bi-directional voice and data communications including components for transmitting and receiving communications, including a communications manager 1510, a network communications manager 1515, a transceiver 1520, an antenna 1525, memory 1530, a processor 1540, and an inter-station communications manager 1545. These components may be in electronic communication via one or more buses (e.g., bus 1550).

The communications manager 1510 may transmit a first rate matching resource indication that indicates to a UE that a first rate matching resource is available for use by the UE in reception of a downlink shared channel, transmit a second rate matching resource indication that indicates that a second rate matching resource is not available for use by the UE in reception of the downlink shared channel, identify a rate matching resource indication conflict arising from an overlap of at least one resource element included in both the first rate matching resource and the second rate matching resource, resolve the rate matching resource indication conflict in accordance with a conflict resolution rule, and transmit one or more signals via the downlink shared channel in accordance with the conflict resolution rule.

The network communications manager 1515 may manage communications with the core network (e.g., via one or more wired backhaul links). For example, the network communications manager 1515 may manage the transfer of data communications for client devices, such as one or more UEs 115.

The transceiver 1520 may communicate bi-directionally, via one or more antennas, wired, or wireless links as described above. For example, the transceiver 1520 may represent a wireless transceiver and may communicate bi-directionally with another wireless transceiver. The transceiver 1520 may also include a modem to modulate the packets and provide the modulated packets to the antennas for transmission, and to demodulate packets received from the antennas.

In some cases, the wireless device may include a single antenna 1525. However, in some cases the device may have more than one antenna 1525, which may be capable of concurrently transmitting or receiving multiple wireless transmissions.

The memory 1530 may include RAM, ROM, or a combination thereof. The memory 1530 may store computer-readable code 1535 including instructions that, when executed by a processor (e.g., the processor 1540) cause the device to perform various functions described herein. In some cases, the memory 1530 may contain, among other things, a BIOS which may control basic hardware or software operation such as the interaction with peripheral components or devices.

The processor 1540 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1540 may be configured to operate a memory array using a memory controller. In some cases, a memory controller may be integrated into processor 1540. The processor 1540 may be configured to execute computer-readable instructions stored in a memory (e.g., the memory 1530) to cause the device 1505 to perform various functions (e.g., functions or tasks supporting resolving conflicting rate matching resource indications).

The inter-station communications manager 1545 may manage communications with other base station 105, and may include a controller or scheduler for controlling communications with UEs 115 in cooperation with other base stations 105. For example, the inter-station communications manager 1545 may coordinate scheduling for transmissions to UEs 115 for various interference mitigation techniques such as beamforming or joint transmission. In some examples, the inter-station communications manager 1545 may provide an X2 interface within an LTE/LTE-A wireless communication network technology to provide communication between base stations 105.

The code 1535 may include instructions to implement aspects of the present disclosure, including instructions to support wireless communications. The code 1535 may be stored in a non-transitory computer-readable medium such as system memory or other type of memory. In some cases, the code 1535 may not be directly executable by the processor 1540 but may cause a computer (e.g., when compiled and executed) to perform functions described herein.

Figure 16:
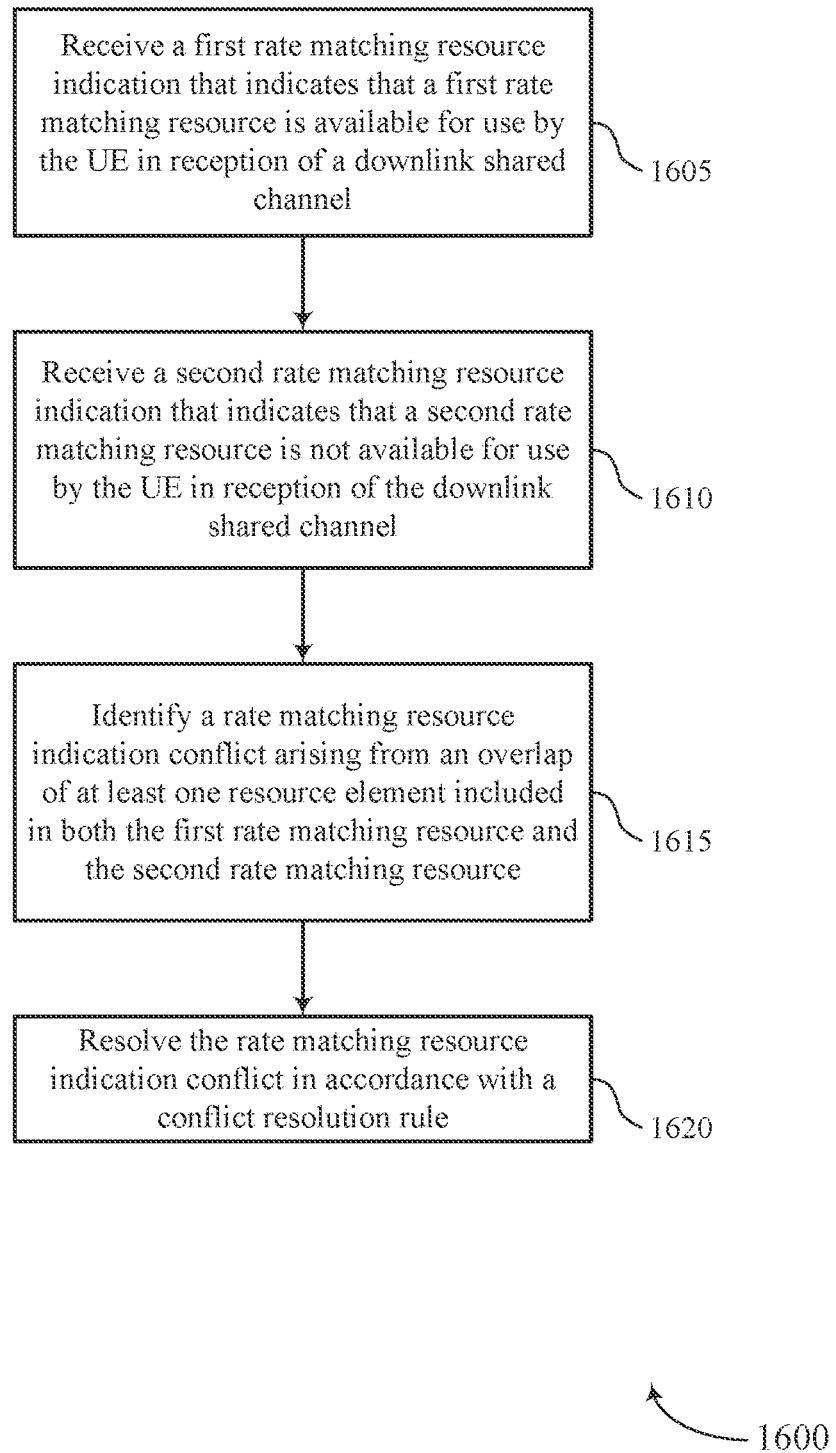
FIGS. 16 through 21 show flowcharts illustrating methods that support aspects of the present disclosure.

FIG. 16 shows a flowchart illustrating a method 1600 that supports aspects of the present disclosure. The operations of method 1600 may be implemented by a UE 115 or its components as described herein. For example, the operations of method 1600 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1605, the UE may receive a first rate matching resource indication that indicates that a first rate matching resource is available for use by the UE in reception of a downlink shared channel. The operations of 1605 may be performed according to the methods described herein. In some examples, aspects of the operations of 1605 may be performed by a rate matching resource indication component as described with reference to FIGS. 8 through 11.

At 1610, the UE may receive a second rate matching resource indication that indicates that a second rate matching resource is not available for use by the UE in reception of the downlink shared channel. The operations of 1610 may be performed according to the methods described herein. In some examples, aspects of the operations of 1610 may be performed by a rate matching resource indication component as described with reference to FIGS. 8 through 11.

At 1615, the UE may identify a rate matching resource indication conflict arising from an overlap of at least one resource element included in both the first rate matching resource and the second rate matching resource. The operations of 1615 may be performed according to the methods described herein. In some examples, aspects of the operations of 1615 may be performed by an indication conflict identifying component as described with reference to FIGS. 8 through 11.

At 1620, the UE may resolve the rate matching resource indication conflict in accordance with a conflict resolution rule. The operations of 1620 may be performed according to the methods described herein. In some examples, aspects of the operations of 1620 may be performed by a conflict resolving component as described with reference to FIGS. 8 through 11.

Figure 17:
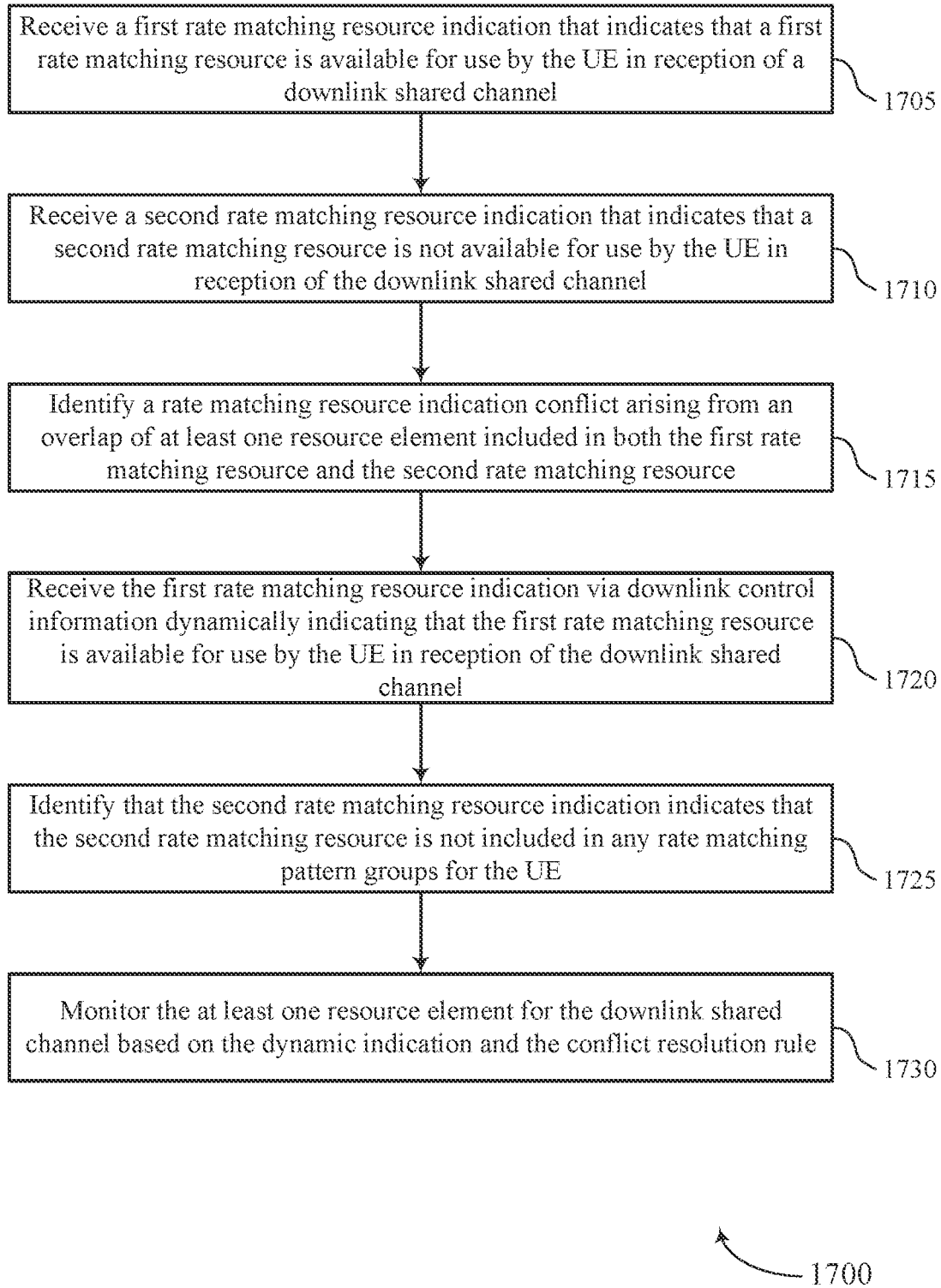

FIG. 17 shows a flowchart illustrating a method 1700 that supports aspects of the present disclosure. The operations of method 1700 may be implemented by a UE 115 or its components as described herein. For example, the operations of method 1700 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1705, the UE may receive a first rate matching resource indication that indicates that a first rate matching resource is available for use by the UE in reception of a downlink shared channel. The operations of 1705 may be performed according to the methods described herein. In some examples, aspects of the operations of 1705 may be performed by a rate matching resource indication component as described with reference to FIGS. 8 through 11.

At 1710, the UE may receive a second rate matching resource indication that indicates that a second rate matching resource is not available for use by the UE in reception of the downlink shared channel. The operations of 1710 may be performed according to the methods described herein. In some examples, aspects of the operations of 1710 may be performed by a rate matching resource indication component as described with reference to FIGS. 8 through 11.

At 1715, the UE may identify a rate matching resource indication conflict arising from an overlap of at least one resource element included in both the first rate matching resource and the second rate matching resource. The operations of 1715 may be performed according to the methods described herein. In some examples, aspects of the operations of 1715 may be performed by an indication conflict identifying component as described with reference to FIGS. 8 through 11.

At 1720, the UE may receive the first rate matching resource indication via downlink control information dynamically indicating that the first rate matching resource is available for use by the UE in reception of the downlink shared channel. The operations of 1720 may be performed according to the methods described herein. In some examples, aspects of the operations of 1720 may be performed by an indication conflict identifying component as described with reference to FIGS. 8 through 11.

At 1725, the UE may identify that the second rate matching resource indication indicates that the second rate matching resource is not included in any rate matching pattern groups for the UE. The operations of 1725 may be performed according to the methods described herein. In some examples, aspects of the operations of 1725 may be performed by an indication conflict identifying component as described with reference to FIGS. 8 through 11.

The UE may then resolve the rate matching resource indication conflict. For example, at 1730, the UE may monitor the at least one resource element for the downlink shared channel based on the dynamic indication and the conflict resolution rule. The operations of 1730 may be performed according to the methods described herein. In some examples, aspects of the operations of 1730 may be performed by a monitoring component as described with reference to FIGS. 8 through 11.

Figure 18:
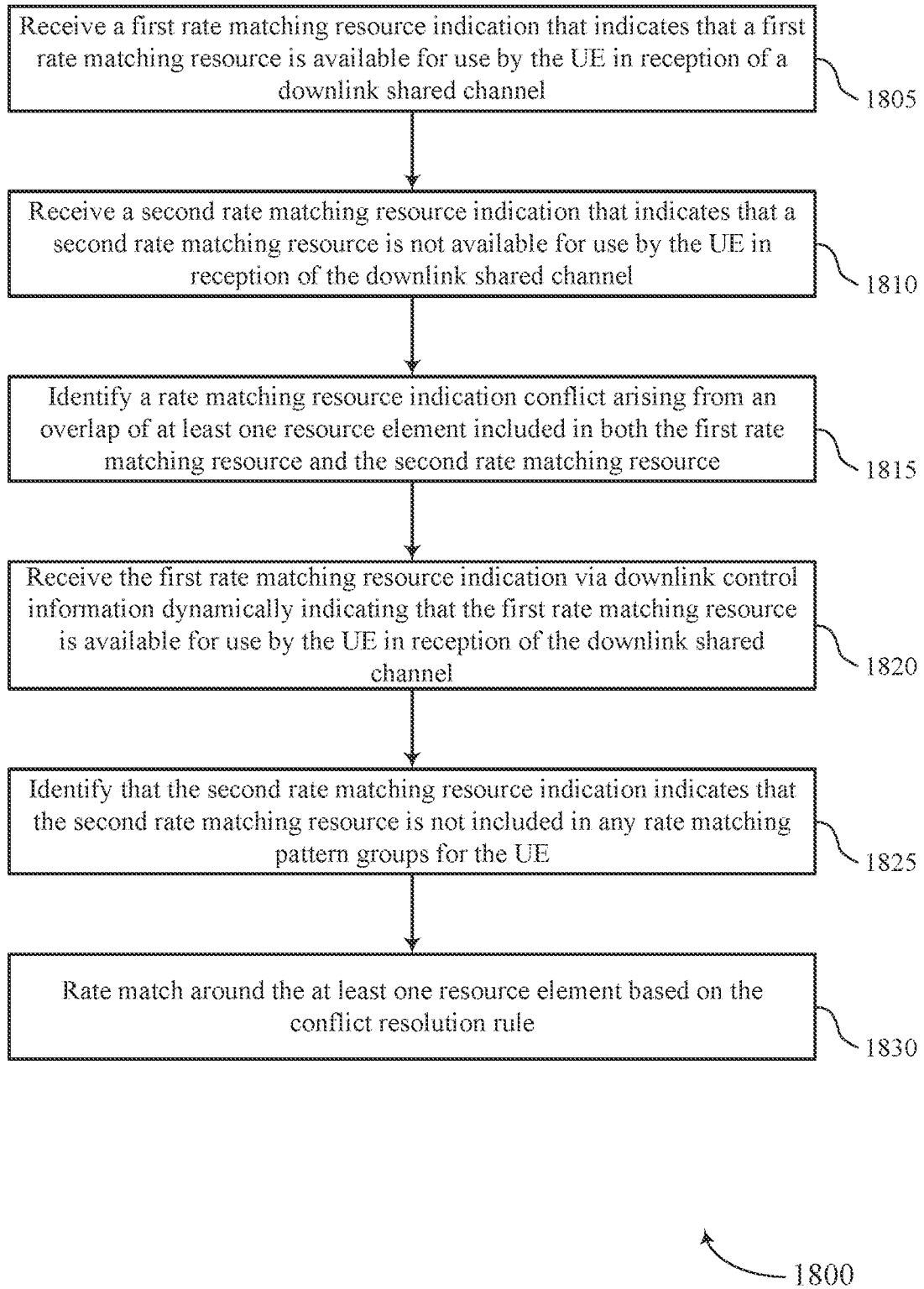

FIG. 18 shows a flowchart illustrating a method 1800 that supports aspects of the present disclosure. The operations of method 1800 may be implemented by a UE 115 or its components as described herein. For example, the operations of method 1800 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1805, the UE may receive a first rate matching resource indication that indicates that a first rate matching resource is available for use by the UE in reception of a downlink shared channel. The operations of 1805 may be performed according to the methods described herein. In some examples, aspects of the operations of 1805 may be performed by a rate matching resource indication component as described with reference to FIGS. 8 through 11.

At 1810, the UE may receive a second rate matching resource indication that indicates that a second rate matching resource is not available for use by the UE in reception of the downlink shared channel. The operations of 1810 may be performed according to the methods described herein. In some examples, aspects of the operations of 1810 may be performed by a rate matching resource indication component as described with reference to FIGS. 8 through 11.

At 1815, the UE may identify a rate matching resource indication conflict arising from an overlap of at least one resource element included in both the first rate matching resource and the second rate matching resource. The operations of 1815 may be performed according to the methods described herein. In some examples, aspects of the operations of 1815 may be performed by an indication conflict identifying component as described with reference to FIGS. 8 through 11.

At 1820, the UE may receive the first rate matching resource indication via downlink control information dynamically indicating that the first rate matching resource is available for use by the UE in reception of the downlink shared channel. The operations of 1820 may be performed according to the methods described herein. In some examples, aspects of the operations of 1820 may be performed by an indication conflict identifying component as described with reference to FIGS. 8 through 11.

At 1825, the UE may identify that the second rate matching resource indication indicates that the second rate matching resource is not included in any rate matching pattern groups for the UE. The operations of 1825 may be performed according to the methods described herein. In some examples, aspects of the operations of 1825 may be performed by an indication conflict identifying component as described with reference to FIGS. 8 through 11.

The UE may then resolve the rate matching resource indication conflict. For example, at 1830, the UE may rate match around the at least one resource element based on the conflict resolution rule. The operations of 1830 may be performed according to the methods described herein. In some examples, aspects of the operations of 1830 may be performed by a rate matching component as described with reference to FIGS. 8 through 11.

Figure 19:
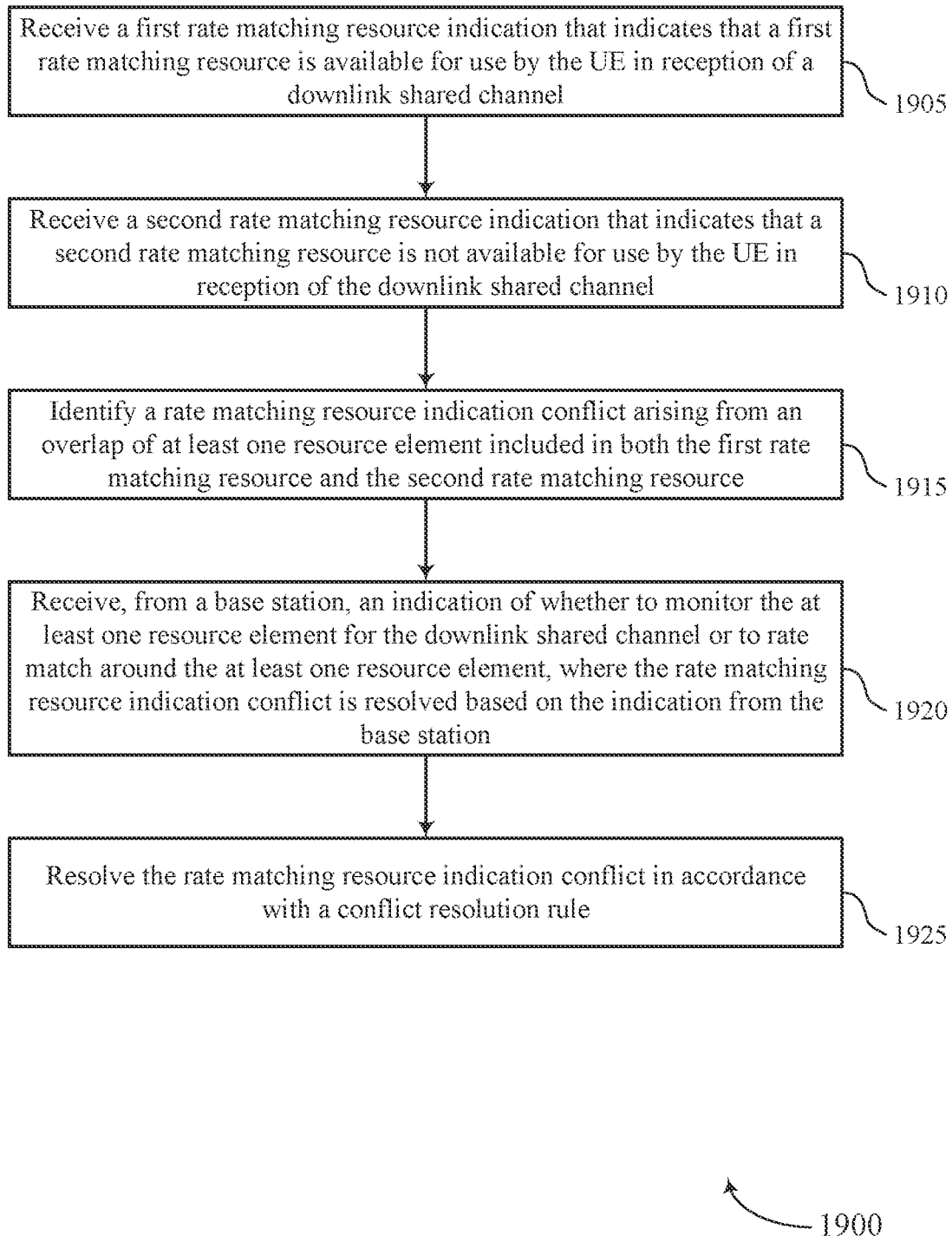

FIG. 19 shows a flowchart illustrating a method 1900 that supports aspects of the present disclosure. The operations of method 1900 may be implemented by a UE 115 or its components as described herein. For example, the operations of method 1900 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 1905, the UE may receive a first rate matching resource indication that indicates that a first rate matching resource is available for use by the UE in reception of a downlink shared channel. The operations of 1905 may be performed according to the methods described herein. In some examples, aspects of the operations of 1905 may be performed by a rate matching resource indication component as described with reference to FIGS. 8 through 11.

At 1910, the UE may receive a second rate matching resource indication that indicates that a second rate matching resource is not available for use by the UE in reception of the downlink shared channel. The operations of 1910 may be performed according to the methods described herein. In some examples, aspects of the operations of 1910 may be performed by a rate matching resource indication component as described with reference to FIGS. 8 through 11.

At 1915, the UE may identify a rate matching resource indication conflict arising from an overlap of at least one resource element included in both the first rate matching resource and the second rate matching resource. The operations of 1915 may be performed according to the methods described herein. In some examples, aspects of the operations of 1915 may be performed by an indication conflict identifying component as described with reference to FIGS. 8 through 11.

At 1920, the UE may receive, from a base station, an indication of whether to monitor the at least one resource element for the downlink shared channel or to rate match around the at least one resource element, where the rate matching resource indication conflict is resolved based on the indication from the base station. The operations of 1920 may be performed according to the methods described herein. In some examples, aspects of the operations of 1920 may be performed by a conflict resolving component as described with reference to FIGS. 8 through 11.

At 1925, the UE may resolve the rate matching resource indication conflict in accordance with a conflict resolution rule. The operations of 1925 may be performed according to the methods described herein. In some examples, aspects of the operations of 1925 may be performed by a conflict resolving component as described with reference to FIGS. 8 through 11.

Figure 20:
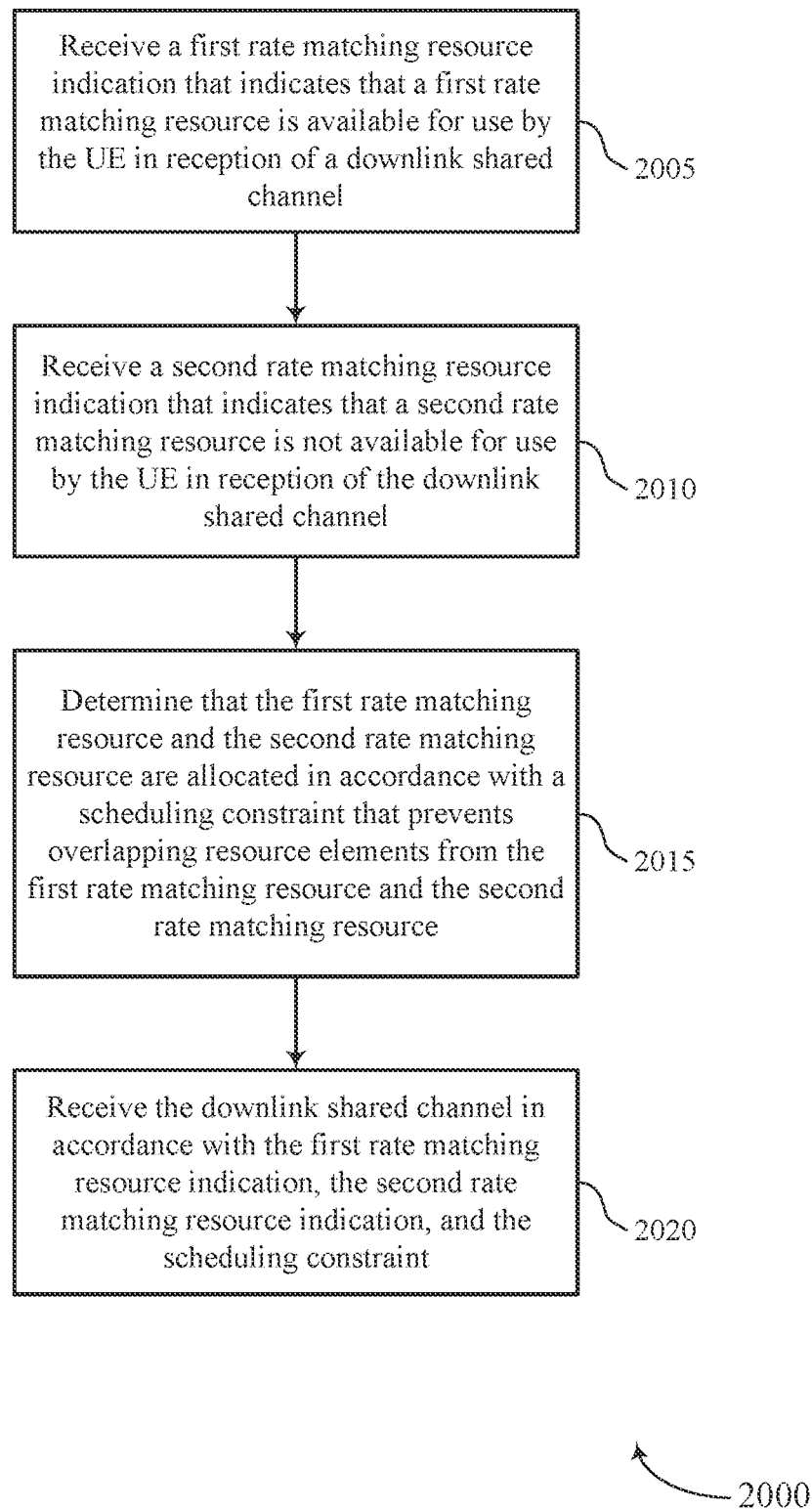

FIG. 20 shows a flowchart illustrating a method 2000 that supports aspects of the present disclosure. The operations of method 2000 may be implemented by a UE 115 or its components as described herein. For example, the operations of method 2000 may be performed by a communications manager as described with reference to FIGS. 8 through 11. In some examples, a UE may execute a set of instructions to control the functional elements of the UE to perform the functions described below. Additionally or alternatively, a UE may perform aspects of the functions described below using special-purpose hardware.

At 2005, the UE may receive a first rate matching resource indication that indicates that a first rate matching resource is available for use by the UE in reception of a downlink shared channel. The operations of 2005 may be performed according to the methods described herein. In some examples, aspects of the operations of 2005 may be performed by a rate matching resource indication component as described with reference to FIGS. 8 through 11.

At 2010, the UE may receive a second rate matching resource indication that indicates that a second rate matching resource is not available for use by the UE in reception of the downlink shared channel. The operations of 2010 may be performed according to the methods described herein. In some examples, aspects of the operations of 2010 may be performed by a rate matching resource indication component as described with reference to FIGS. 8 through 11.

At 2015, the UE may determine that the first rate matching resource and the second rate matching resource are allocated in accordance with a scheduling constraint that prevents overlapping resource elements from the first rate matching resource and the second rate matching resource. The operations of 2015 may be performed according to the methods described herein. In some examples, aspects of the operations of 2015 may be performed by a scheduling constraint component as described with reference to FIGS. 8 through 11.

At 2020, the UE may receive the downlink shared channel in accordance with the first rate matching resource indication, the second rate matching resource indication, and the scheduling constraint. The operations of 2020 may be performed according to the methods described herein. In some examples, aspects of the operations of 2020 may be performed by a downlink shared channel receiving component as described with reference to FIGS. 8 through 11.

Figure 21:
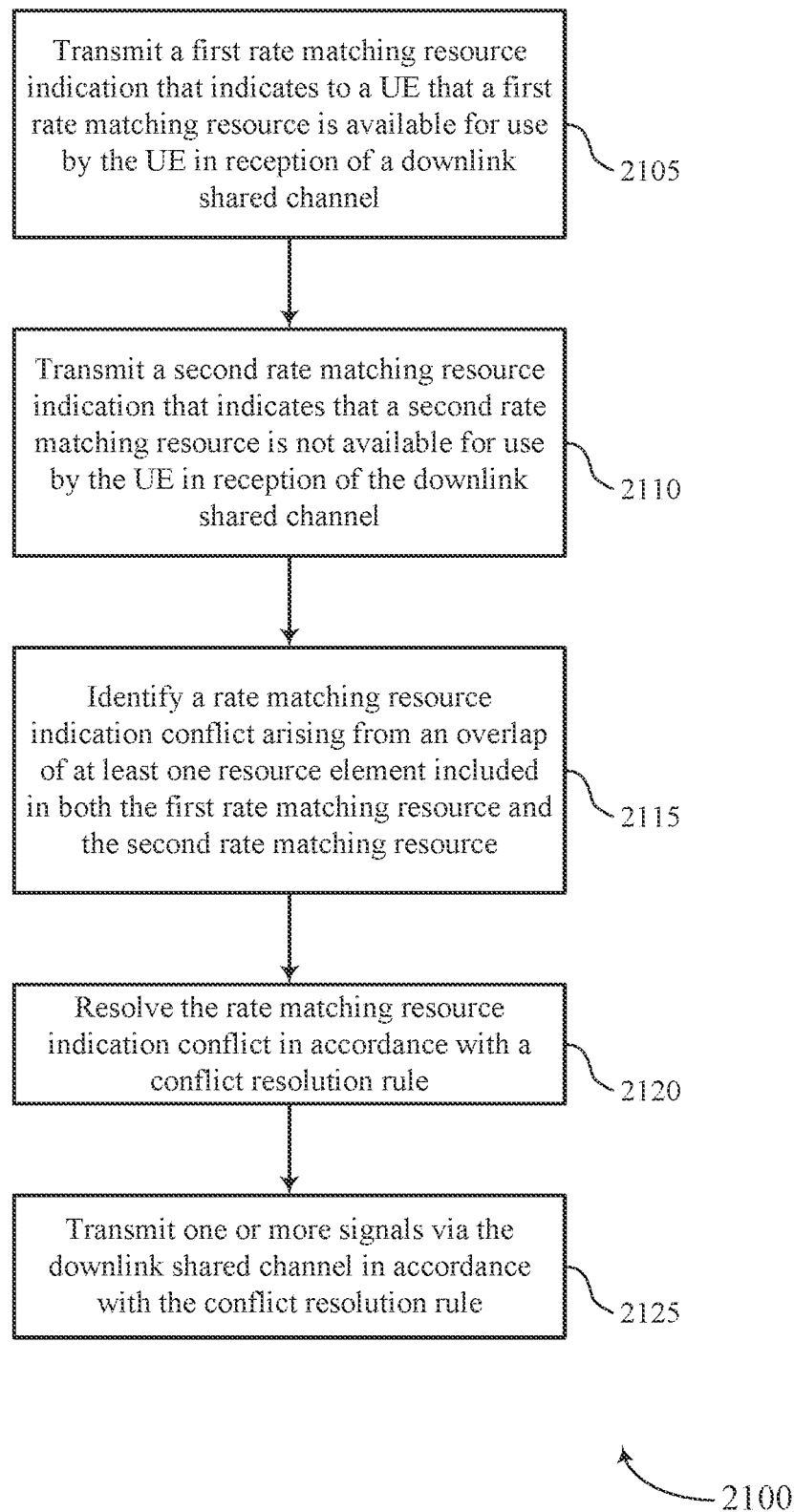

FIG. 21 shows a flowchart illustrating a method 2100 that supports aspects of the present disclosure. The operations of method 2100 may be implemented by a base station 105 or its components as described herein. For example, the operations of method 2100 may be performed by a communications manager as described with reference to FIGS. 12 through 15. In some examples, a base station may execute a set of instructions to control the functional elements of the base station to perform the functions described below. Additionally or alternatively, a base station may perform aspects of the functions described below using special-purpose hardware.

At 2105, the base station may transmit a first rate matching resource indication that indicates to a UE that a first rate matching resource is available for use by the UE in reception of a downlink shared channel. The operations of 2105 may be performed according to the methods described herein. In some examples, aspects of the operations of 2105 may be performed by a rate matching resource indicating component as described with reference to FIGS. 12 through 15.

At 2110, the base station may transmit a second rate matching resource indication that indicates that a second rate matching resource is not available for use by the UE in reception of the downlink shared channel. The operations of 2110 may be performed according to the methods described herein. In some examples, aspects of the operations of 2110 may be performed by a rate matching resource indicating component as described with reference to FIGS. 12 through 15.

At 2115, the base station may identify a rate matching resource indication conflict arising from an overlap of at least one resource element included in both the first rate matching resource and the second rate matching resource. The operations of 2115 may be performed according to the methods described herein. In some examples, aspects of the operations of 2115 may be performed by an indication conflict identifying component as described with reference to FIGS. 12 through 15.

At 2120, the base station may resolve the rate matching resource indication conflict in accordance with a conflict resolution rule. The operations of 2120 may be performed according to the methods described herein. In some examples, aspects of the operations of 2120 may be performed by a conflict resolving component as described with reference to FIGS. 12 through 15.

At 2125, the base station may transmit one or more signals via the downlink shared channel in accordance with the conflict resolution rule. The operations of 2125 may be performed according to the methods described herein. In some examples, aspects of the operations of 2125 may be performed by a downlink shared channel transmitting component as described with reference to FIGS. 12 through 15.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications at a UE, comprising: receiving a first rate matching resource indication that indicates that a first rate matching resource is available for use by the UE in reception of a downlink shared channel; receiving a second rate matching resource indication that indicates that a second rate matching resource is not available for use by the UE in reception of the downlink shared channel; identifying a rate matching resource indication conflict arising from an overlap of at least one resource element included in both the first rate matching resource and the second rate matching resource; and resolving the rate matching resource indication conflict in accordance with a conflict resolution rule.

Aspect 2: The method of aspect 1, wherein identifying the rate matching resource indication conflict comprises: receiving the first rate matching resource indication via downlink control information dynamically indicating that the first rate matching resource is available for use by the UE in reception of the downlink shared channel; and identifying that the second rate matching resource indication indicates that the second rate matching resource is not included in any rate matching pattern groups for the UE.

Aspect 3: The method of aspect 2, wherein resolving the rate matching resource indication conflict further comprises: monitoring the at least one resource element for the downlink shared channel based at least in part on the dynamic indication and the conflict resolution rule.

Aspect 4: The method of aspect 2, wherein resolving the rate matching resource indication conflict further comprises: rate matching around the at least one resource element based at least in part on the conflict resolution rule.

Aspect 5: The method of any of aspects 2 through 4, wherein the first rate matching resource is included within a first rate matching pattern group.

Aspect 6: The method of any of aspects 1 through 5, wherein identifying the rate matching resource indication conflict comprises: receiving downlink control information dynamically indicating that the first rate matching resource included within a first rate matching pattern group is available for use by the UE in reception of the downlink shared channel, and the second rate matching resource included within a second rate matching pattern group is not available for use by the UE in reception of the downlink shared channel.

Aspect 7: The method of aspect 6, wherein the conflict resolution rule is based at least in part on a priority of the first rate matching pattern group and the second rate matching pattern group.

Aspect 8: The method of any of aspects 6 through 7, wherein the conflict resolution rule is based at least in part on a priority of the first rate matching resource indication and the second rate matching resource indication.

Aspect 9: The method of any of aspects 6 through 8, wherein resolving the rate matching resource indication conflict further comprises: monitoring the at least one resource element for the downlink shared channel based at least in part on the dynamic indication and the conflict resolution rule.

Aspect 10: The method of any of aspects 6 through 8, wherein resolving the rate matching resource indication conflict further comprises: rate matching around the at least one resource element based at least in part on the conflict resolution rule.

Aspect 11: The method of any of aspects 1 through 10, wherein identifying the rate matching resource indication conflict comprises: receiving downlink control information dynamically indicating that the first rate matching resource that is included within a first rate matching pattern group is available for use by the UE in reception of the downlink shared channel, wherein the downlink control information also dynamically indicates a third rate matching resource included within a second rate matching pattern group that overlaps the first rate matching resource and the second rate matching resource by the at least one resource element: and identifying that the second rate matching resource indication indicates that the second rate matching resource is not included in any rate matching pattern groups for the UE.

Aspect 12: The method of aspect 11, wherein the downlink control information dynamically indicates that the third rate matching resource included within the second rate matching pattern group is available for use by the UE in reception of the downlink shared channel.

Aspect 13: The method of aspect 12, wherein resolving the rate matching resource indication conflict further comprises: monitoring the at least one resource element for the downlink shared channel based at least in part on the dynamic indication and the conflict resolution rule.

Aspect 14: The method of aspect 12, wherein resolving the rate matching resource indication conflict further comprises: rate matching around the at least one resource element based at least in part on the conflict resolution rule.

Aspect 15: The method of any of aspects 11 through 14, wherein the downlink control information dynamically indicates that the third rate matching resource included within the second rate matching pattern group is not available for use by the UE in reception of the downlink shared channel.

Aspect 16: The method of aspect 15, wherein the conflict resolution rule is based at least in part on a priority of the first rate matching pattern group, the second rate matching pattern group, and the third rate matching resource.

Aspect 17: The method of any of aspects 15 through 16, wherein the conflict resolution rule is based at least in part on a priority of the first rate matching resource indication, the second rate matching resource indication, and a third rate matching resource indication that indicates the third rate matching resource.

Aspect 18: The method of any of aspects 15 through 17, wherein resolving the rate matching resource indication conflict further comprises: monitoring the at least one resource element for the downlink shared channel based at least in part on the dynamic indication and the conflict resolution rule.

Aspect 19: The method of any of aspects 15 through 17, wherein resolving the rate matching resource indication conflict further comprises: rate matching around the at least one resource element based at least in part on the conflict resolution rule.

Aspect 20: The method of any of aspects 1 through 19, wherein the first rate matching resource indication comprises a resource block-level indication that the first rate matching resource is available for use by the UE in reception of the downlink shared channel, and the second rate matching resource indication comprises a resource element-level indication that the second rate matching resource is not available for use by the UE in reception of the downlink shared channel.

Aspect 21: The method of aspect 20, wherein resolving the rate matching resource indication conflict further comprises: monitoring the at least one resource element for the downlink shared channel based at least in part on the resource block-level indication.

Aspect 22: The method of aspect 20, wherein resolving the rate matching resource indication conflict further comprises: rate matching around the at least one resource element based at least in part on the resource element-level indication.

Aspect 23: The method of any of aspects 1 through 22, further comprising: receiving, from a base station, an indication of whether to monitor the at least one resource element for the downlink shared channel or to rate match around the at least one resource element, wherein the rate matching resource indication conflict is resolved based at least in part on the indication from the base station.

Aspect 24: A method for wireless communications, comprising: receiving a first rate matching resource indication that indicates that a first rate matching resource is available for use by the UE in reception of a downlink shared channel; receiving a second rate matching resource indication that indicates that a second rate matching resource is not available for use by the UE in reception of the downlink shared channel; determining that the first rate matching resource and the second rate matching resource are allocated in accordance with a scheduling constraint that prevents overlapping resource elements from the first rate matching resource and the second rate matching resource; and receiving the downlink shared channel in accordance with the first rate matching resource indication, the second rate matching resource indication, and the scheduling constraint.

Aspect 25: The method of aspect 24, further comprising: monitoring the first rate matching resource for the downlink shared channel based at least in part on the scheduling constraint.

Aspect 26: The method of aspect 24, further comprising: rate matching around the second rate matching resource based at least in part on the scheduling constraint.

Aspect 27: A method for wireless communications at a base station, comprising: transmitting a first rate matching resource indication that indicates to a UE that a first rate matching resource is available for use by the UE in reception of a downlink shared channel; transmitting a second rate matching resource indication that indicates that a second rate matching resource is not available for use by the UE in reception of the downlink shared channel; identifying a rate matching resource indication conflict arising from an overlap of at least one resource element included in both the first rate matching resource and the second rate matching resource; resolving the rate matching resource indication conflict in accordance with a conflict resolution rule; and transmitting one or more signals via the downlink shared channel in accordance with the conflict resolution rule.

Aspect 28: The method of aspect 27, wherein identifying the rate matching resource indication conflict comprises: transmitting the first rate matching resource indication via downlink control information dynamically indicating that the first rate matching resource is available for use by the UE in reception of the downlink shared channel; and identifying that the second rate matching resource indication indicates that the second rate matching resource is not included in any rate matching pattern groups for the UE.

Aspect 29: The method of aspect 28, wherein resolving the rate matching resource indication conflict further comprises: transmitting an indication that configures the UE to monitor the at least one resource element for the downlink shared channel based at least in part on the dynamic indication and the conflict resolution rule.

Aspect 30: The method of aspect 28, wherein resolving the rate matching resource indication conflict further comprises: transmitting an indication that configures the UE to rate match around the at least one resource element based at least in part on the conflict resolution rule.

Aspect 31: The method of any of aspects 27 through 30, wherein identifying the rate matching resource indication conflict comprises: transmitting downlink control information dynamically indicating that the first rate matching resource included within a first rate matching pattern group is available for use by the UE in reception of the downlink shared channel, and the second rate matching resource included within a second rate matching pattern group is not available for use by the UE in reception of the downlink shared channel.

Aspect 32: The method of aspect 31, wherein resolving the rate matching resource indication conflict further comprises: transmitting an indication that configures the UE to monitor or rate match based at least in part on a priority of the first rate matching pattern group and the second rate matching pattern group.

Aspect 33: The method of any of aspects 31 through 32, wherein the conflict resolution rule is based at least in part on a priority of the first rate matching resource indication and the second rate matching resource indication.

Aspect 34: The method of any of aspects 31 through 33, wherein resolving the rate matching resource indication conflict further comprises: transmitting the downlink shared channel on the at least one resource element based at least in part on the dynamic indication and the conflict resolution rule.

Aspect 35: The method of any of aspects 31 through 33, wherein resolving the rate matching resource indication conflict further comprises: rate matching around the at least one resource element based at least in part on the conflict resolution rule.

Aspect 36: The method of any of aspects 27 through 35, wherein identifying the rate matching resource indication conflict comprises: transmitting downlink control information dynamically indicating that the first rate matching resource included within a first rate matching pattern group is available for use by the UE in reception of the downlink shared channel, wherein the downlink control information also dynamically indicates a third rate matching resource included within a second rate matching pattern group that overlaps the first rate matching resource and the second rate matching resource by the at least one resource element; and identifying that the second rate matching resource indication indicates that the second rate matching resource is not included in any rate matching pattern groups for the UE.

Aspect 37: The method of aspect 36, wherein the downlink control information dynamically indicates that the third rate matching resource included within the second rate matching pattern group is available for use by the UE in reception of the downlink shared channel.

Aspect 38: The method of aspect 37, wherein resolving the rate matching resource indication conflict further comprises: transmitting the downlink shared channel on the at least one resource element based at least in part on the dynamic indication and the conflict resolution rule.

Aspect 39: The method of aspect 37, wherein resolving the rate matching resource indication conflict further comprises: rate matching around the at least one resource element based at least in part on the conflict resolution rule.

Aspect 40: The method of any of aspects 36 through 39, wherein the downlink control information dynamically indicates that the third rate matching resource included within the second rate matching pattern group is not available for use by the UE in reception of the downlink shared channel.

Aspect 41: The method of aspect 40, wherein the conflict resolution rule is based at least in part on a priority of the first rate matching pattern group, the second rate matching pattern group, and the third rate matching pattern group.

Aspect 42: The method of any of aspects 40 through 41, wherein the conflict resolution rule is based at least in part on a priority of the first rate matching resource indication, the second rate matching resource indication, and a third rate matching resource indication that indicates the third rate matching resource.

Aspect 43: The method of aspect 40, wherein resolving the rate matching resource indication conflict further comprises: transmitting the downlink shared channel on the at least one resource element based at least in part on the dynamic indication and the conflict resolution rule.

Aspect 44: The method of aspect 40, wherein resolving the rate matching resource indication conflict further comprises: rate matching around the at least one resource element based at least in part on the conflict resolution rule.

Aspect 45: The method of any of aspects 27 through 44, wherein the first rate matching resource indication comprises a resource element-level indication that the first rate matching resource is available for use by the UE in reception of the downlink shared channel, and the second rate matching resource indication comprises a resource block-level indication that the second rate matching resource is not available for use by the UE in reception of the downlink shared channel.

Aspect 46: The method of aspect 45, wherein resolving the rate matching resource indication conflict further comprises: transmitting an indication that configures the UE to monitor the at least one resource element for the downlink shared channel based at least in part on the resource block-level indication.

Aspect 47: The method of any of aspects 45 through 46, wherein resolving the rate matching resource indication conflict further comprises: transmitting an indication that configures the UE to rate match around the at least one resource element based at least in part on the resource element-level indication.

Aspect 48: An apparatus for wireless communications at a UE, comprising a processor; memory coupled with the processor; and instructions stored in the memory and executable by the processor to cause the apparatus to perform a method of any of aspects 1 through 23.

Aspect 49: An apparatus for wireless communications at a UE, comprising at least one means for performing a method of any of aspects 1 through 23.

Aspect 50: A non-transitory computer-readable medium storing code for wireless communications at a UE, the code comprising instructions executable by a processor to perform a method of any of aspects 1 through 23.

Aspect 51: An apparatus for wireless communications, comprising a processor; memory coupled with the processor; and instructions stored in the memory and executable by the processor to cause the apparatus to perform a method of any of aspects 24 through 26.

Aspect 52: An apparatus for wireless communications, comprising at least one means for performing a method of any of aspects 24 through 26.

Aspect 53: A non-transitory computer-readable medium storing code for wireless communications, the code comprising instructions executable by a processor to perform a method of any of aspects 24 through 26.

Aspect 54: An apparatus for wireless communications at a base station, comprising a processor; memory coupled with the processor; and instructions stored in the memory and executable by the processor to cause the apparatus to perform a method of any of aspects 27 through 47.

Aspect 55: An apparatus for wireless communications at a base station, comprising at least one means for performing a method of any of aspects 27 through 47.

Aspect 56: A non-transitory computer-readable medium storing code for wireless communications at a base station, the code comprising instructions executable by a processor to perform a method of any of aspects 27 through 47.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include random-access memory (RAM), read-only memory (ROM), electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B. or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications at a user equipment (UE), comprising:
    receiving a first rate matching resource indication that indicates that a first rate matching resource is available for use by the UE in reception of a downlink shared channel;
    receiving a second rate matching resource indication that indicates that a second rate matching resource is not available for use by the UE in reception of the downlink shared channel;
    identifying a rate matching resource indication conflict arising from an overlap of at least one resource element included in both the first rate matching resource and the second rate matching resource; and
    resolving the rate matching resource indication conflict in accordance with a conflict resolution rule and based at least in part on an additional indication received from a network device of whether to monitor the at least one resource element for the downlink shared channel or to rate match around the at least one resource element.

2. The method of claim 1, wherein identifying the rate matching resource indication conflict comprises:
    receiving the first rate matching resource indication via downlink control information that includes a dynamic indication that the first rate matching resource is available for use by the UE in reception of the downlink shared channel; and
    identifying that the second rate matching resource indication indicates that the second rate matching resource is not included in any rate matching pattern groups for the UE.

3. The method of claim 2, wherein resolving the rate matching resource indication conflict further comprises:
    monitoring the at least one resource element for the downlink shared channel based at least in part on the dynamic indication and the conflict resolution rule, wherein the additional indication from the network device of whether to monitor the at least one resource element for the downlink shared channel or to rate match around the at least one resource element is the dynamic indication.

4. The method of claim 2, wherein resolving the rate matching resource indication conflict further comprises:
    rate matching around the at least one resource element based at least in part on the conflict resolution rule.

5. The method of claim 2, wherein the first rate matching resource is included within a first rate matching pattern group.

6. The method of claim 1, wherein identifying the rate matching resource indication conflict comprises:
    receiving downlink control information that includes a dynamic indication that the first rate matching resource included within a first rate matching pattern group is available for use by the UE in reception of the downlink shared channel, and the second rate matching resource included within a second rate matching pattern group is not available for use by the UE in reception of the downlink shared channel, wherein the additional indication from the network device of whether to monitor the at least one resource element for the downlink shared channel or to rate match around the at least one resource element is the dynamic indication.

7. The method of claim 6, wherein the conflict resolution rule is based at least in part on a priority of the first rate matching pattern group and the second rate matching pattern group.

8. The method of claim 6, wherein the conflict resolution rule is based at least in part on a priority of the first rate matching resource indication and the second rate matching resource indication.

9. The method of claim 6, wherein resolving the rate matching resource indication conflict further comprises:
monitoring the at least one resource element for the downlink shared channel based at least in part on the dynamic indication and the conflict resolution rule.

10. The method of claim 6, wherein resolving the rate matching resource indication conflict further comprises:
rate matching around the at least one resource element based at least in part on the conflict resolution rule.

11. The method of claim 1, wherein identifying the rate matching resource indication conflict comprises:
receiving downlink control information that includes a dynamic indication that the first rate matching resource that is included within a first rate matching pattern group is available for use by the UE in reception of the downlink shared channel, wherein the dynamic indication also indicates a third rate matching resource included within a second rate matching pattern group that overlaps the first rate matching resource and the second rate matching resource by the at least one resource element, wherein the additional indication from the network device of whether to monitor the at least one resource element for the downlink shared channel or to rate match around the at least one resource element is the dynamic indication; and
identifying that the second rate matching resource indication indicates that the second rate matching resource is not included in any rate matching pattern groups for the UE.

12. The method of claim 11, wherein the dynamic indication indicates that the third rate matching resource included within the second rate matching pattern group is available for use by the UE in reception of the downlink shared channel.

13. The method of claim 12, wherein resolving the rate matching resource indication conflict further comprises:
monitoring the at least one resource element for the downlink shared channel based at least in part on the dynamic indication and the conflict resolution rule.

14. The method of claim 12, wherein resolving the rate matching resource indication conflict further comprises:
rate matching around the at least one resource element based at least in part on the conflict resolution rule.

15. The method of claim 11, wherein the dynamic indication indicates that the third rate matching resource included within the second rate matching pattern group is not available for use by the UE in reception of the downlink shared channel.

16. The method of claim 15, wherein the conflict resolution rule is based at least in part on a priority of the first rate matching pattern group, the second rate matching pattern group, and the third rate matching resource.

17. The method of claim 15, wherein the conflict resolution rule is based at least in part on a priority of the first rate matching resource indication, the second rate matching resource indication, and a third rate matching resource indication that indicates the third rate matching resource.

18. The method of claim 15, wherein resolving the rate matching resource indication conflict further comprises:
monitoring the at least one resource element for the downlink shared channel based at least in part on the dynamic indication and the conflict resolution rule.

19. The method of claim 15, wherein resolving the rate matching resource indication conflict further comprises:
rate matching around the at least one resource element based at least in part on the conflict resolution rule.

20. An apparatus for wireless communications at a user equipment (UE), comprising:
a processor,
memory coupled with the processor; and
instructions stored in the memory and executable by the processor to cause the apparatus to:
receive a first rate matching resource indication that indicates that a first rate matching resource is available for use by the UE in reception of a downlink shared channel;
receive a second rate matching resource indication that indicates that a second rate matching resource is not available for use by the UE in reception of the downlink shared channel;
identify a rate matching resource indication conflict arising from an overlap of at least one resource element included in both the first rate matching resource and the second rate matching resource; and
resolve the rate matching resource indication conflict in accordance with a conflict resolution rule and based at least in part on an additional indication received from a network device of whether to monitor the at least on resource element for the downlink shared channel or to rate match around the at least one resource element.

21. The apparatus of claim 20, wherein the instructions to rate matching resource indication conflict are further executable by the processor to cause the apparatus to:
receive the first rate matching resource indication via downlink control information that includes a dynamic indication that the first rate matching resource is available for use by the UE in reception of the downlink shared channel; and
identify that the second rate matching resource indication indicates that the second rate matching resource is not included in any rate matching pattern groups for the UE.

22. The apparatus of claim 20, wherein the instructions to identify the rate matching resource indication conflict are further executable by the processor to cause the apparatus to:
receive downlink control information that includes a dynamic indication that the first rate matching resource included within a first rate matching pattern group is available for use by the UE in reception of the downlink shared channel, and the second rate matching resource included within a second rate matching pattern group is not available for use by the UE in reception of the downlink shared channel.

23. An apparatus for wireless communications at a user equipment (UE), comprising:
a processor,
memory coupled with the processor; and instructions stored in the memory and executable by the processor to cause the apparatus to:
- receive a rate matching resource block-level indication that indicates that a first rate matching resource is available for use by the UE in reception of a downlink shared channel;
- receive a rate matching resource element-level indication that indicates that a second rate matching resource is not available for use by the UE in reception of the downlink shared channel;
- determine that the first rate matching resource and the second rate matching resource are allocated in accordance with a scheduling constraint that prevents overlapping resource elements from the first rate matching resource and the second rate matching resource; and
- receive the downlink shared channel in accordance with the rate matching resource block-level indication, the rate matching resource element-level indication, and the scheduling constraint.

24. A method for wireless communications at a user equipment (UE), comprising:
- receiving a rate matching resource block-level indication that indicates that a first rate matching resource is available for use by the UE in reception of a downlink shared channel;
- receiving a rate matching resource element-level indication that indicates that a second rate matching resource is not available for use by the UE in reception of the downlink shared channel;
- identifying a rate matching resource indication conflict arising from an overlap of at least one resource element included in both the first rate matching resource and the second rate matching resource; and
- resolving the rate matching resource indication conflict in accordance with a conflict resolution rule.

25. The method of claim 24, wherein identifying the rate matching resource indication conflict comprises:
- receiving the rate matching resource block-level indication via downlink control information that includes a dynamic indication that the first rate matching resource is available for use by the UE in reception of the downlink shared channel; and
- identifying that the rate matching resource element-level indication indicates that the second rate matching resource is not included in any rate matching pattern groups for the UE.

26. The method of claim 25, wherein resolving the rate matching resource indication conflict further comprises:
- monitoring the at least one resource element for the downlink shared channel based at least in part on the dynamic indication and the conflict resolution rule.

27. The method of claim 25, wherein resolving the rate matching resource indication conflict further comprises:
- rate matching around the at least one resource element based at least in part on the conflict resolution rule.

28. The method of claim 25, wherein the first rate matching resource is included within a first rate matching pattern group.

29. The method of claim 24, wherein resolving the rate matching resource indication conflict further comprises:
- monitoring the at least one resource element for the downlink shared channel based at least in part on the resource block-level indication.

30. The method of claim 24, wherein resolving the rate matching resource indication conflict further comprises:
- rate matching around the at least one resource element based at least in part on the resource element-level indication.

* * * * *